United States Patent
Luo et al.

(10) Patent No.: US 12,463,690 B2
(45) Date of Patent: Nov. 4, 2025

(54) STARTING PORT FOR ANTENNA SUBARRAY

(71) Applicant: QUALCOMM Incorporated, San Diego, CA (US)

(72) Inventors: Jianghong Luo, Skillman, NJ (US); Hung Dinh Ly, San Diego, CA (US); Navid Abedini, Basking Ridge, NJ (US)

(73) Assignee: Qualcomm Incorporated, San Diego, CA (US)

( * ) Notice: Subject to any disclaimer, the term of this patent is extended or adjusted under 35 U.S.C. 154(b) by 265 days.

(21) Appl. No.: 18/296,730

(22) Filed: Apr. 6, 2023

(65) Prior Publication Data

US 2024/0340048 A1 Oct. 10, 2024

(51) Int. Cl.
*H04B 7/06* (2006.01)
(52) U.S. Cl.
CPC ......... *H04B 7/0608* (2013.01); *H04B 7/0626* (2013.01)

(58) Field of Classification Search
CPC .......................... H04B 7/0608; H04B 7/0626
USPC ........................................................ 375/262
See application file for complete search history.

(56) References Cited

U.S. PATENT DOCUMENTS

| | | | |
|---|---|---|---|
| 2017/0202014 A1* | 7/2017 | Moon | H04B 7/0626 |
| 2017/0244462 A1* | 8/2017 | Wei | H04B 7/0626 |

* cited by examiner

*Primary Examiner* — Fitwi Y Hailegiorgis
(74) *Attorney, Agent, or Firm* — Harrity & Harrity, LLP

(57) ABSTRACT

Various aspects of the present disclosure generally relate to wireless communication. In some aspects, a network entity may select a subset of channel state information reference signal (CSI-RS) ports from a CSI-RS resource associated with a two-dimensional antenna array. The subset of CSI-RS ports may be associated with an antenna subarray having a reduced size. The network entity may transmit an indication of a starting port of the subset of CSI-RS ports in supplemental configuration information. Numerous other aspects are described.

20 Claims, 17 Drawing Sheets

STARTING PORT FOR ANTENNA SUBARRAY

FIELD OF THE DISCLOSURE

Aspects of the present disclosure generally relate to wireless communication and to techniques and apparatuses for indicating a starting port for an antenna subarray.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network entity. The method may include selecting a subset of channel state information (CSI) reference signal (CSI-RS) ports from a CSI-RS resource associated with a two-dimensional antenna array, where the subset of CSI-RS ports is associated with an antenna subarray having a reduced size. The method may include transmitting an indication of a starting port of the subset of CSI-RS ports in supplemental configuration information.

Some aspects described herein relate to a method of wireless communication performed by a user equipment (UE). The method may include obtaining an indication of a starting port of a subset of CSI-RS ports from a CSI-RS resource associated with a two-dimensional antenna array, where the subset of CSI-RS ports is associated with an antenna subarray having a reduced size. The method may include deriving the subset of CSI-RS ports for the antenna array based at least in part on the starting port. The method may include generating a CSI report based at least in part on one or more reference signals transmitted from the subset of CSI-RS ports. The method may include transmitting the CSI report.

Some aspects described herein relate to a method of wireless communication performed by a UE. The method may include selecting one or more scaling factors that are to be applied to a base computation load to indicate a CSI processing capability of the UE. The method may include transmitting an indication of the one or more scaling factors.

Some aspects described herein relate to a method of wireless communication performed by a network entity. The method may include receiving an indication of one or more scaling factors that are used with a base computation load to indicate a CSI processing capability of a UE. The method may include adjusting a CSI configuration based at least in part on a previous report if there is no new report received with the indication of the one or more scaling factors.

Some aspects described herein relate to a network entity for wireless communication. The network entity may include a memory and one or more processors coupled to the memory. The one or more processors may be configured to select a subset of CSI-RS ports from a CSI-RS resource associated with a two-dimensional antenna array, where the subset of CSI-RS ports is associated with an antenna subarray having a reduced size. The one or more processors may be configured to transmit an indication of a starting port of the subset of CSI-RS ports in supplemental configuration information.

Some aspects described herein relate to a UE for wireless communication. The UE may include a memory and one or more processors coupled to the memory. The one or more processors may be configured to obtain an indication of a starting port of a subset of CSI-RS ports from a CSI-RS resource associated with a two-dimensional antenna array, where the subset of CSI-RS ports is associated with an antenna subarray having a reduced size. The one or more processors may be configured to derive the subset of CSI-RS ports for the antenna array based at least in part on the starting port. The one or more processors may be configured to generate a CSI report based at least in part on one or more reference signals transmitted from the subset of CSI-RS ports. The one or more processors may be configured to transmit the CSI report.

Some aspects described herein relate to a UE for wireless communication. The UE may include a memory and one or more processors coupled to the memory. The one or more processors may be configured to select one or more scaling factors that is to be applied to a base computation load to indicate a CSI processing capability of the UE. The one or more processors may be configured to transmit an indication of the one or more scaling factors.

Some aspects described herein relate to a network entity for wireless communication. The network entity may include a memory and one or more processors coupled to the memory. The one or more processors may be configured to receive an indication of one or more scaling factors that are used with a base computation load to indicate a CSI processing capability of a UE. The one or more processors may be configured to adjust a CSI configuration based at least in part on a previous report if there is no new report received with the indication of the one or more scaling factors.

Some aspects described herein relate to a non-transitory computer-readable medium that stores a set of instructions for wireless communication by a network entity. The set of instructions, when executed by one or more processors of the network entity, may cause the network entity to select a subset of CSI-RS ports from a CSI-RS resource associated with a two-dimensional antenna array, where the subset of CSI-RS ports is associated with an antenna subarray having a reduced size. The set of instructions, when executed by one or more processors of the network entity, may cause the network entity to transmit an indication of a starting port of the subset of CSI-RS ports in supplemental configuration information.

Some aspects described herein relate to a non-transitory computer-readable medium that stores a set of instructions for wireless communication by a UE. The set of instructions, when executed by one or more processors of the UE, may cause the UE to obtain an indication of a starting port of a subset of CSI-RS ports from a CSI-RS resource associated with a two-dimensional antenna array, where the subset of CSI-RS ports is associated with an antenna subarray having a reduced size. The set of instructions, when executed by one or more processors of the UE, may cause the UE to derive the subset of CSI-RS ports for the antenna array based at least in part on the starting port. The set of instructions, when executed by one or more processors of the UE, may cause the UE to generate a CSI report based at least in part on one or more reference signals transmitted from the subset of CSI-RS ports. The set of instructions, when executed by one or more processors of the UE, may cause the UE to transmit the CSI report.

Some aspects described herein relate to a non-transitory computer-readable medium that stores a set of instructions for wireless communication by a UE. The set of instructions, when executed by one or more processors of the UE, may cause the UE to select one or more scaling factors that are to be applied to a base computation load to indicate a CSI processing capability of the UE. The set of instructions, when executed by one or more processors of the UE, may cause the UE to transmit an indication of the one or more scaling factors.

Some aspects described herein relate to a non-transitory computer-readable medium that stores a set of instructions for wireless communication by a network entity. The set of instructions, when executed by one or more processors of the network entity, may cause the network entity to receive an indication of one or more scaling factors that are used with a base computation load to indicate a CSI processing capability of a UE. The set of instructions, when executed by one or more processors of the network entity, may cause the network entity to adjust a CSI configuration based at least in part on a previous report if there is no new report received with the indication of the one or more scaling factors.

Some aspects described herein relate to an apparatus for wireless communication. The apparatus may include means for selecting a subset of CSI-RS ports from a CSI-RS resource associated with a two-dimensional antenna array, where the subset of CSI-RS ports is associated with an antenna subarray having a reduced size. The apparatus may include means for transmitting an indication of a starting port of the subset of CSI-RS ports in supplemental configuration information.

Some aspects described herein relate to an apparatus for wireless communication. The apparatus may include means for obtaining an indication of a starting port of a subset of CSI-RS ports from a CSI-RS resource associated with a two-dimensional antenna array, where the subset of CSI-RS ports is associated with an antenna subarray having a reduced size. The apparatus may include means for deriving the subset of CSI-RS ports for the antenna array based at least in part on the starting port. The apparatus may include means for generating a CSI report based at least in part on one or more reference signals transmitted from the subset of CSI-RS ports. The apparatus may include means for transmitting the CSI report.

Some aspects described herein relate to an apparatus for wireless communication. The apparatus may include means for selecting one or more scaling factors that are to be applied to a base computation load to indicate a CSI processing capability of the apparatus. The apparatus may include means for transmitting an indication of the one or more scaling factors.

Some aspects described herein relate to an apparatus for wireless communication. The apparatus may include means for receiving an indication of one or more scaling factors that are used with a base computation load to indicate a CSI processing capability of another apparatus. The apparatus may include means for adjusting a CSI configuration based at least in part on a previous report if there is no new report received with the indication of the one or more scaling factors.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
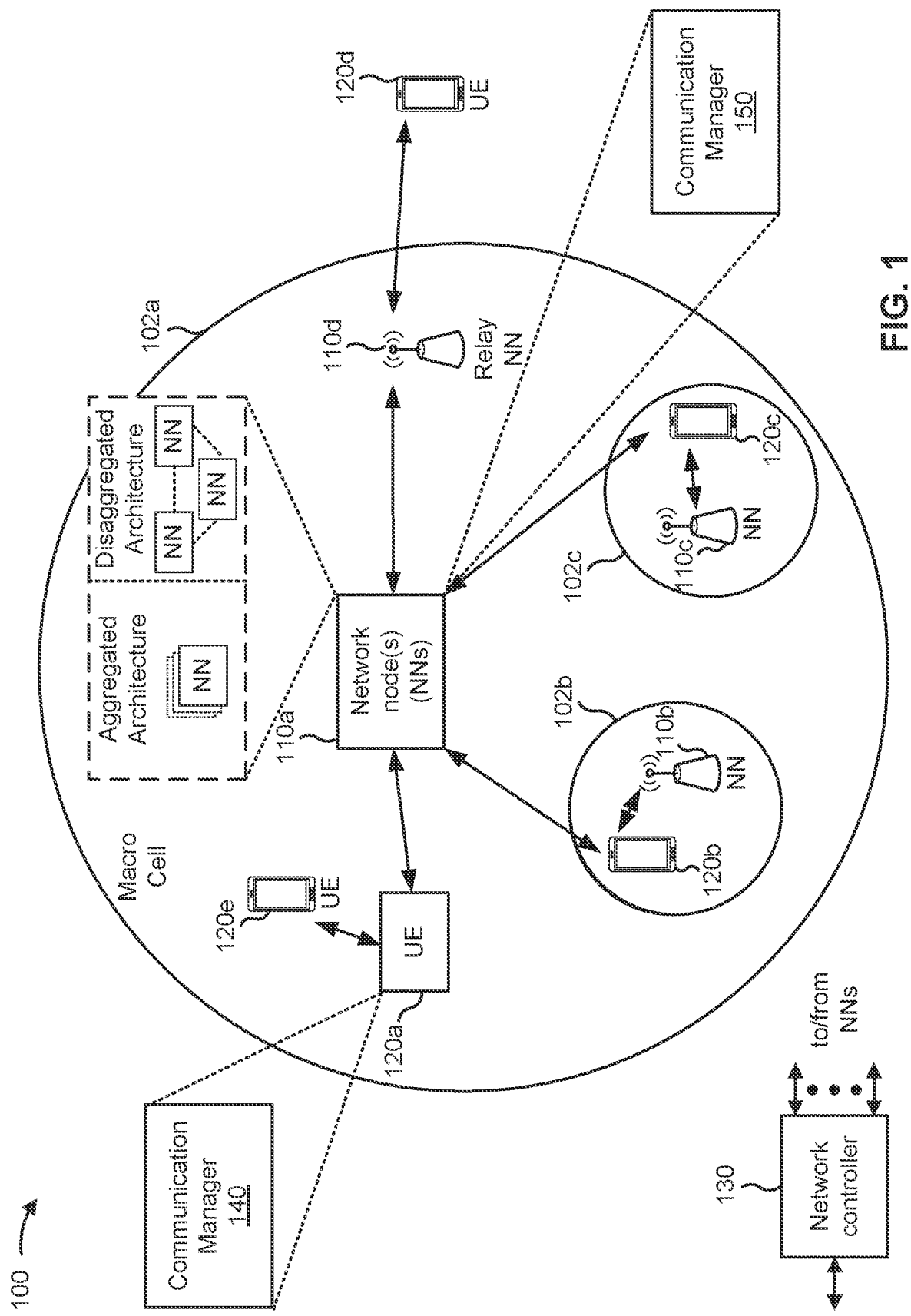
FIG. 1 is a diagram illustrating an example of a wireless network, in accordance with the present disclosure.

A user equipment (UE) may measure channel state information (CSI) reference signals (CSI-RSs) and provide CSI feedback to a network entity for beam management and communication scheduling. The CSI-RSs may be part of a CSI-RS resource that is associated with a two-dimensional antenna array. A network entity (e.g., gNB) may transmit a CSI-RS signal associated with a full antenna array, and the UE may generate multiple CSIs for different antenna subarrays using the same received CSI-RS signal. Each subarray is associated with a subset of CSI-RS ports and the corresponding subset of time/frequency/code resources of the CSI-RS signal. The different subarrays are used by the UE for the purpose of CSI calculation. The network entity may explicitly indicate all of the selected ports for antenna elements of an antenna subarray. However, this consumes signaling resources.

According to various aspects described herein, a UE may obtain an indication of the antenna subarray with fewer signaling resources. The indication may indicate a starting port and a size of the antenna subarray, by which the UE can derive a subset of CSI-RS ports associated with the antenna subarray. By indicating the starting port (and not all of the ports), the UE may reduce the signaling overhead and conserve signaling resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may obtain an indication of a starting port of a subset of CSI reference signal (CSI-RS) ports from a CSI-RS resource associated with a two-dimensional antenna array, where the subset of CSI-RS ports is associated with an antenna sub-array having a reduced size. The communication manager 140 may derive the subset of CSI-RS ports for the antenna array based at least in part on the starting port. The communication manager 140 may generate a CSI report based at least in part on one or more reference signals transmitted from the subset of CSI-RS ports. The communication manager 140 may transmit the CSI report.

In some aspects, the communication manager 140 may select one or more scaling factors that are to be applied to a base computation load to indicate a CSI processing capability of the UE. The communication manager 140 may transmit an indication of the one or more scaling factors. Additionally, or alternatively, the communication manager 140 may perform one or more other operations described herein.

In some aspects, a network entity (e.g., a network node 110) may include a communication manager 150. As described in more detail elsewhere herein, the communication manager 150 may select a subset of CSI-RS ports from a CSI-RS resource associated with a two-dimensional antenna array, where the subset of CSI-RS ports is associated with an antenna subarray having a reduced size. The communication manager 150 may transmit an indication of a starting port of the subset of CSI-RS ports in supplemental configuration information.

In some aspects, the communication manager 150 may receive an indication of one or more scaling factors that are used with a base computation load to indicate a CSI processing capability of a UE. The communication manager 150 may adjust a CSI configuration based at least in part on a previous report if there is no new report received with the indication of the one or more scaling factors. Additionally, or alternatively, the communication manager 150 may perform one or more other operations described herein.

As indicated above, FIG. 1 is provided as an example. Other examples may differ from what is described with regard to FIG. 1.

Figure 2:
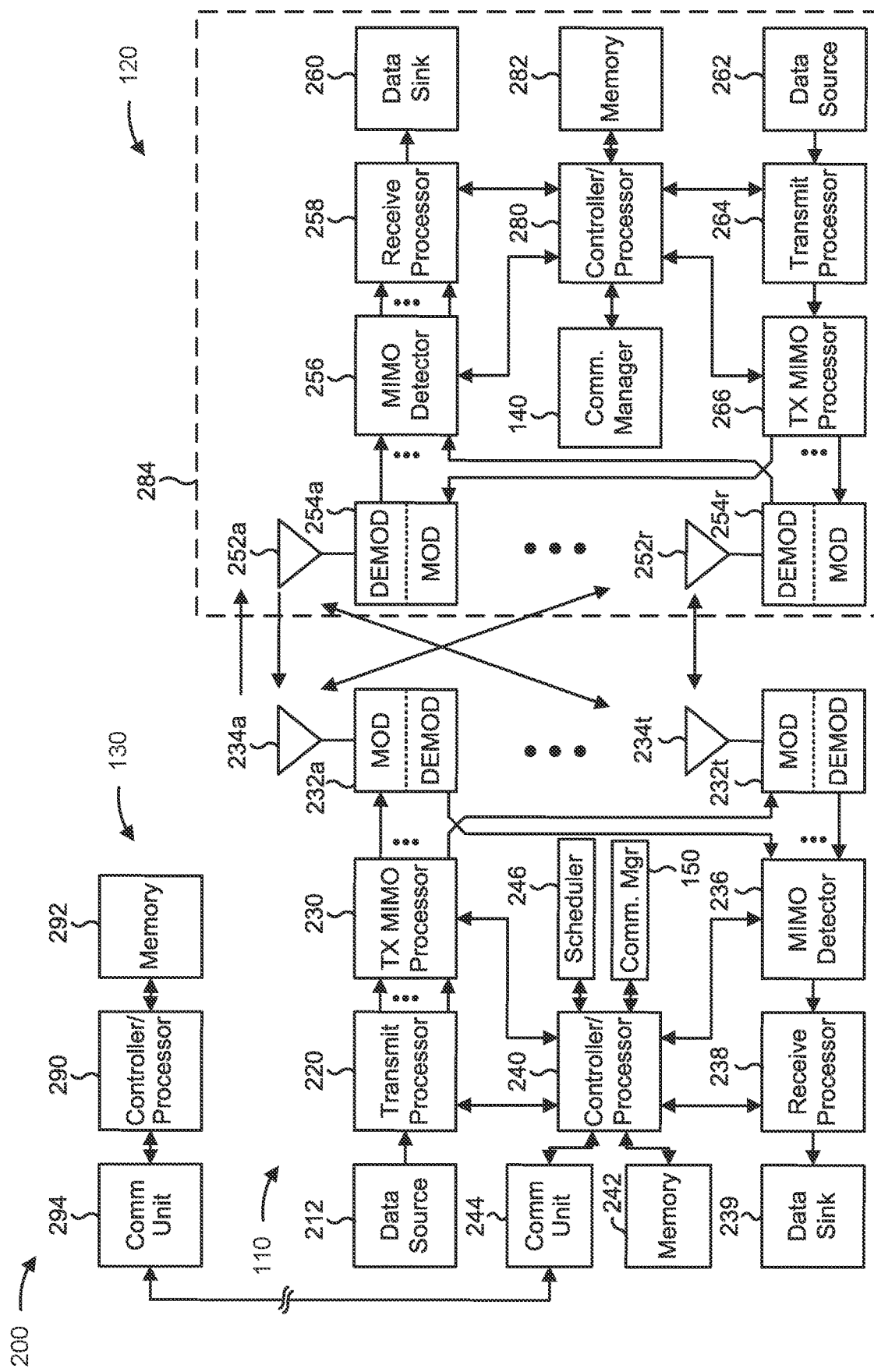
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-17).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-17).

The controller/processor 240 of the network node 110, the controller/processor 280 of the UE 120, and/or any other component(s) of FIG. 2 may perform one or more techniques associated with indicating a starting port for an antenna subarray or one or more scaling factors for a CSI processing capability, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, a UE (e.g., a UE 120) includes means for obtaining an indication of a starting port of a subset of CSI-RS ports from a CSI-RS resource associated with a two-dimensional antenna array, where the subset of CSI-RS ports is associated with an antenna subarray having a reduced size; means for deriving the subset of CSI-RS ports for the antenna array based at least in part on the starting port; means for generating a CSI report based at least in part on one or more reference signals transmitted from the subset of CSI-RS ports; and/or means for transmitting the CSI report.

In some aspects, the UE includes means for selecting one or more scaling factors that are to be applied to a base computation load to indicate a CSI processing capability of the UE; and/or means for transmitting an indication of the one or more scaling factors. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a network node 110) includes means for selecting a subset of CSI-RS ports from a CSI-RS resource associated with a two-dimensional antenna array, where the subset of CSI-RS ports is associated with an antenna subarray having a reduced size; and/or means for transmitting an indication of a starting port of the subset of CSI-RS ports in supplemental configuration information.

In some aspects, the network entity includes means for receiving an indication of one or more scaling factors that are used with a base computation load to indicate a CSI processing capability of a UE; and/or means for adjusting a CSI configuration based at least in part on a previous report if there is no new report received with the indication of the one or more scaling factors. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
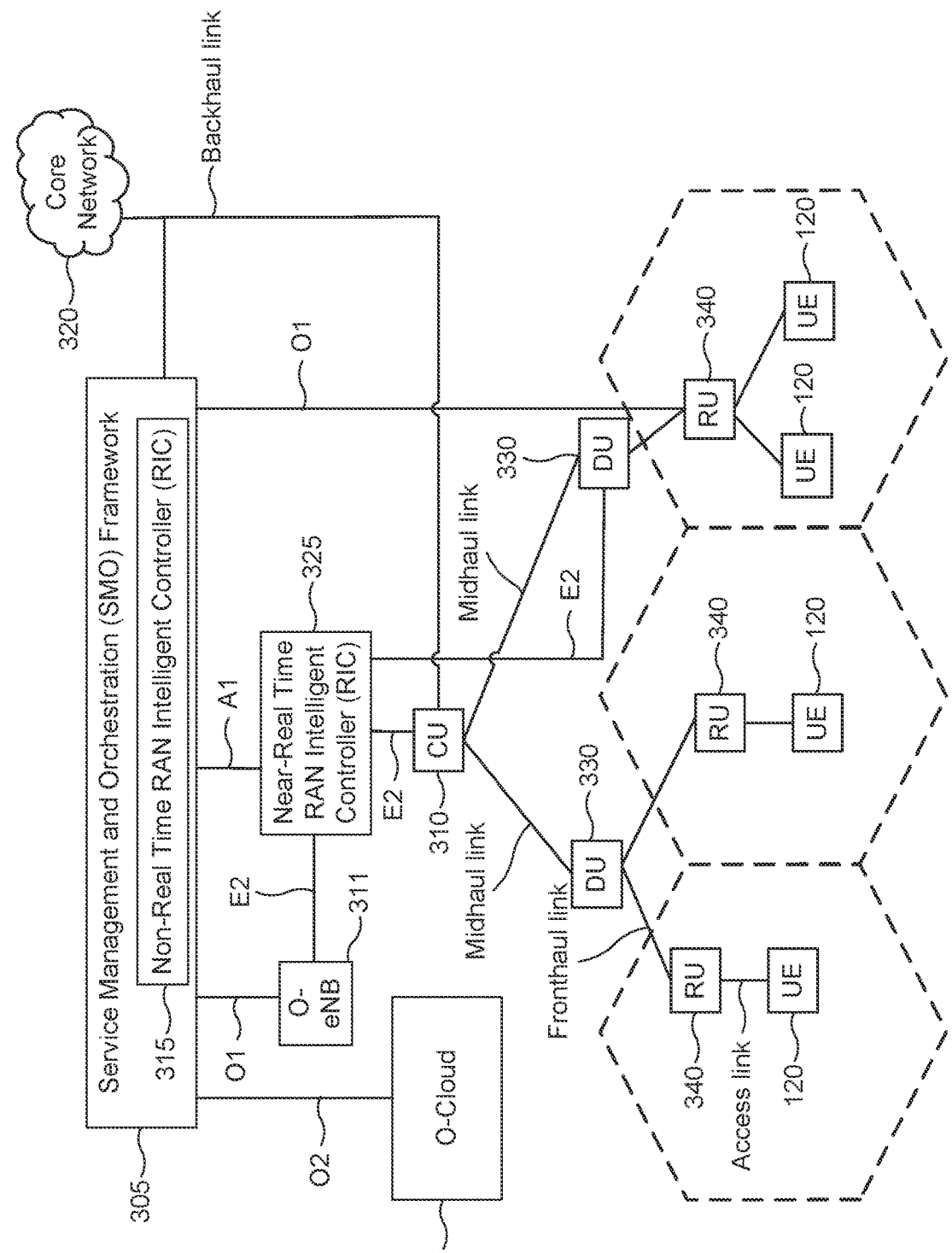
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-realtime aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
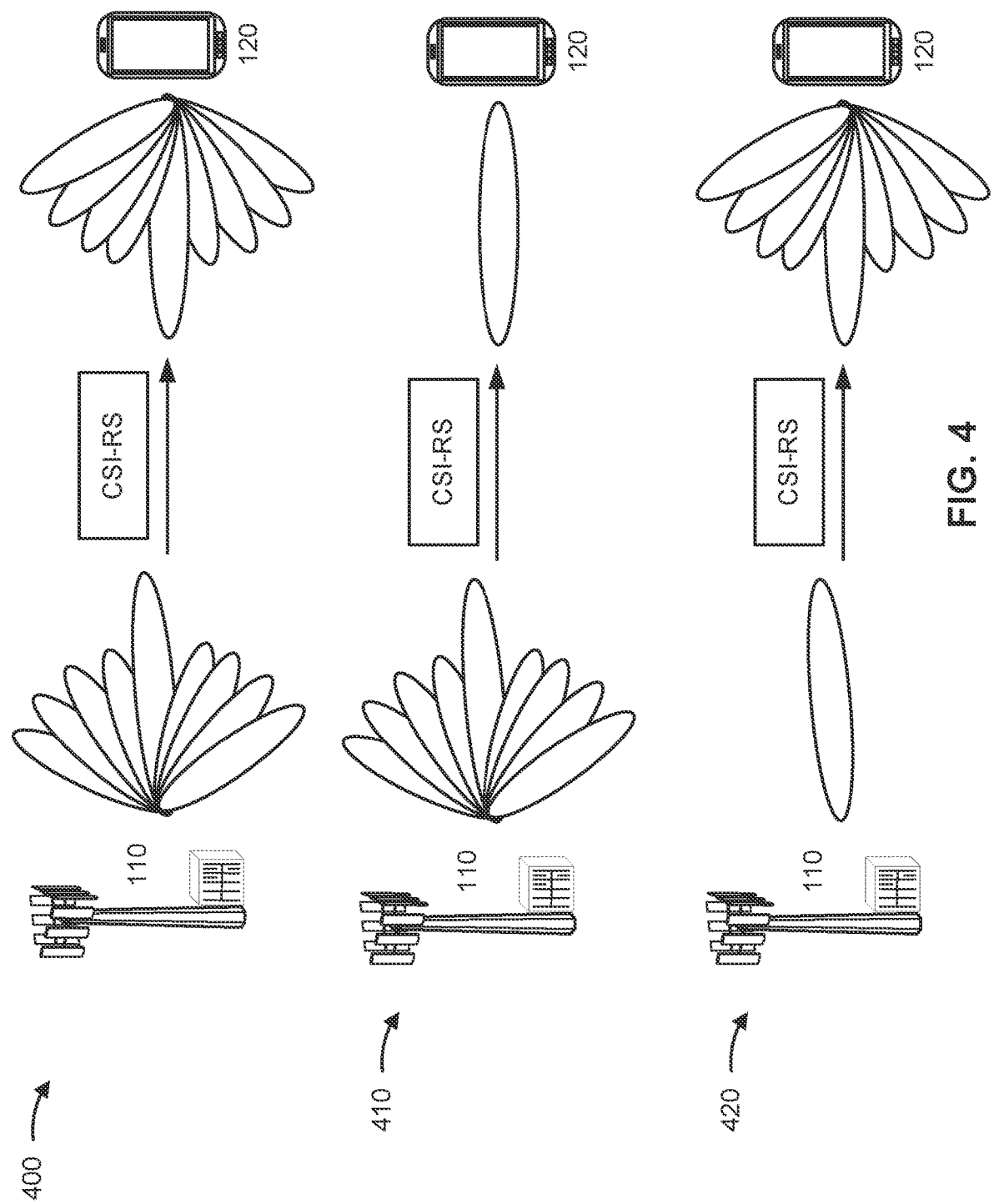
FIG. 4 is a diagram illustrating examples of channel state information (CSI) reference signal (CSI-RS) beam management procedures, in accordance with the present disclosure.

FIG. 4 is a diagram illustrating examples 400, 410, and 420 of CSI-RS beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or transmit receive point (TRP), between a mobile termination node and a control node, between an integrated access and backhaul (IAB) child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same reference signal (RS) resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
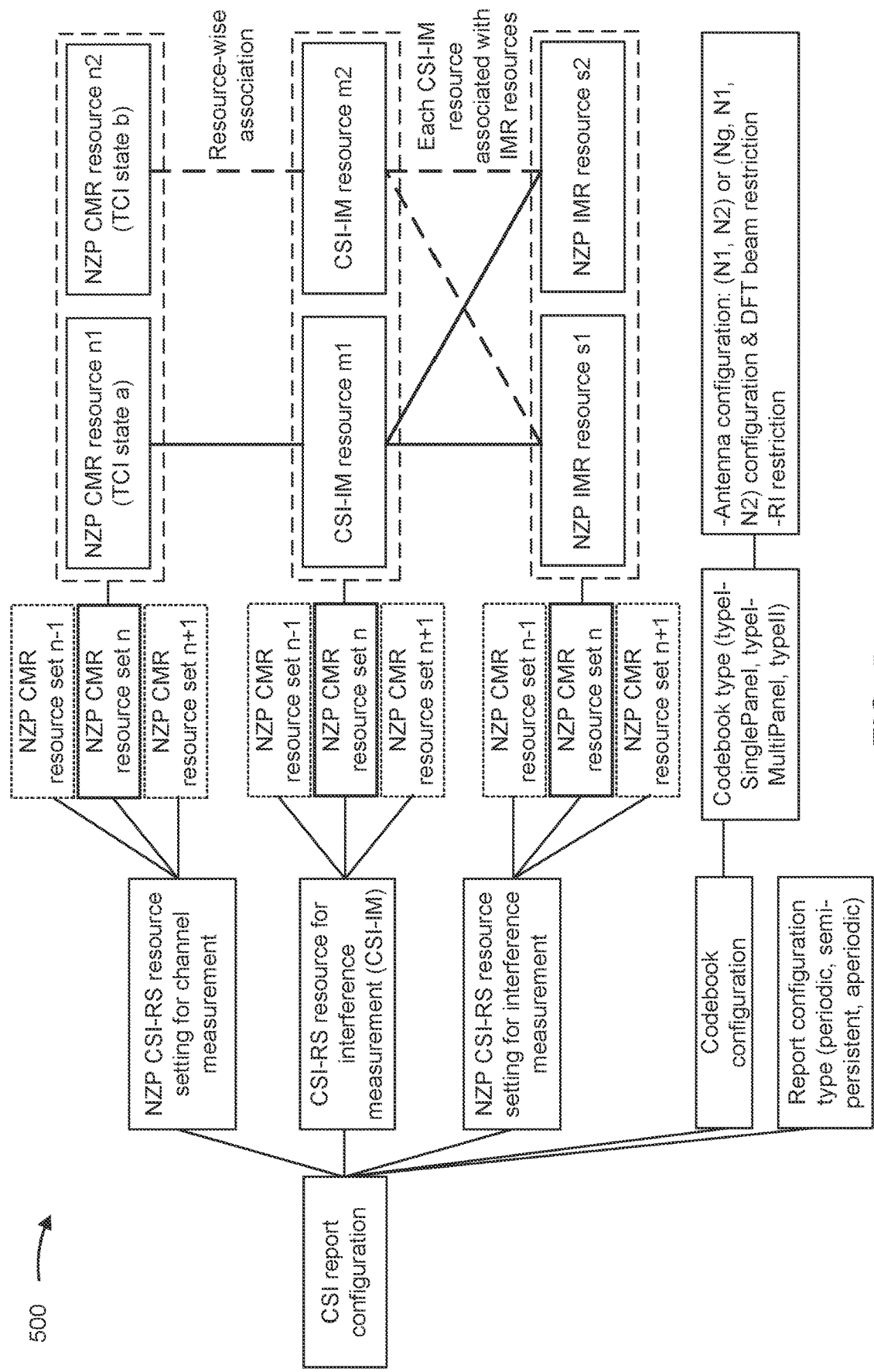
FIG. 5 is a diagram illustrating an example of a CSI report configuration, in accordance with the present disclosure.

FIG. 5 is a diagram illustrating an example 500 of a CSI report configuration, in accordance with the present disclosure.

A CSI report configuration may be configured per bandwidth part (BWP). A resource set has Ks resources with the same quantity of CSI-RS ports. If Ks=1, each resource may contain at most 32 CSI-RS ports. If Ks=2, each resource may contain at most 16 CSI-RS ports. For Ks=2 to 8, each resource may contain at most 8 CSI-RS ports. A P-port resource has ports labeled from 3000 to 3000 (P-1).

Example 500 shows a CSI report configuration, which may include a CSI resource setting for a channel measurement resource (CMR), a CSI resource setting for CMR and CSI interference measurement (CSI-IM) or non-zero power (NZP) interference measurement resource (IMR), and a CSI resource setting for CMR and CSI-IM and NZP-IMR. Each resource setting may have one active resource set, and each resource set may have one or more resources (N resources). A UE may evaluate CSI corresponding to the N NZP CMR resources and select 1 (one) CMR resource out of N resources. The UE may report a CSI-RS resource indicator (CRI) as part of CSI feedback. The network entity (e.g., gNB) may need to determine a reported CSI that corresponds to an NZP CMR resource. The CSI report configuration may also be referred to as a "CSI report setting." As described herein, a first CSI report setting may be associated with a second CSI report setting for linking reporting occasions in slots for transmission of CSI reports.

The CSI report configuration may include a codebook configuration that includes a codebook type, such as Type I single panel, Type I multi-panel, Type II single panel, Type II port selection, or Type II enhanced port selection. A codebook type may have an antenna configuration of Ng panels with dimensions N1 and N2. The codebook type may be associated with a DFT beam restriction. The codebook type may have a rank indicator (RI) restriction, or a limit on the quantity of layers. The CSI report configuration may be of a report configuration type (e.g., periodic, semi-persistent, aperiodic).

A UE may use a same set of CSI-RS resources for CSI measurements for different adaptation configurations. In some aspects, the UE may derive CSI for reduced antenna port configurations from a CSI-RS resource with a higher quantity of reports. The UE may transmit supplemental CSI (S-CSI) that is associated with reduced antenna configurations. S-CSI may be derived from the resources configured for the base antenna configuration. The UE may be configured with restriction rules on CSI-RS resources and a codebook for the reduced antenna configuration.

In an example, a CSI report configuration 0 (zero) may include a resource setting and a codebook configuration. A full antenna configuration may include a 32-port CSI-RS resource and a codebook configuration where N1=4 and N2=4. A CSI measurement and report for a reduced antenna configuration may include, for example, a 4-port CSI-RS with N1=2 and N2=1, an 8-port CSI-RS with N1=2 and N2=2, an 8-port CSI-RS with N1=4 and N2=1, or a 16-port CSI-RS with N1=4 and N2=2.

There may be two signaling approaches. One option may include separate CSI report configurations, where a CSI report configuration includes a full antenna configuration and a new supplemental configuration for reduced antenna configuration. Another option may involve using the same CSI report configuration, where a CSI report configuration is extended by adding a new information element (IE) with supplemental configuration information for a reduced antenna configuration.

As indicated above, FIG. 5 is provided as an example. Other examples may differ from what is described with regard to FIG. 5.

Figure 6:
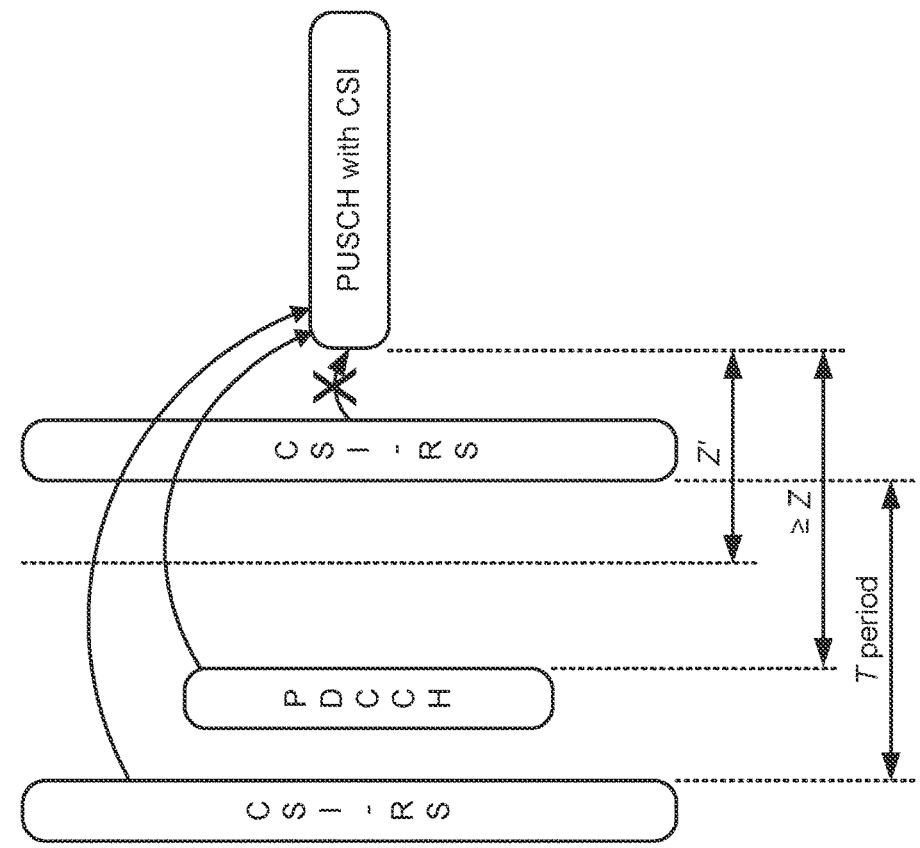
FIG. 6 is a diagram illustrating an example of computing CSI processing parameters, in accordance with the present disclosure.
Figure 6:
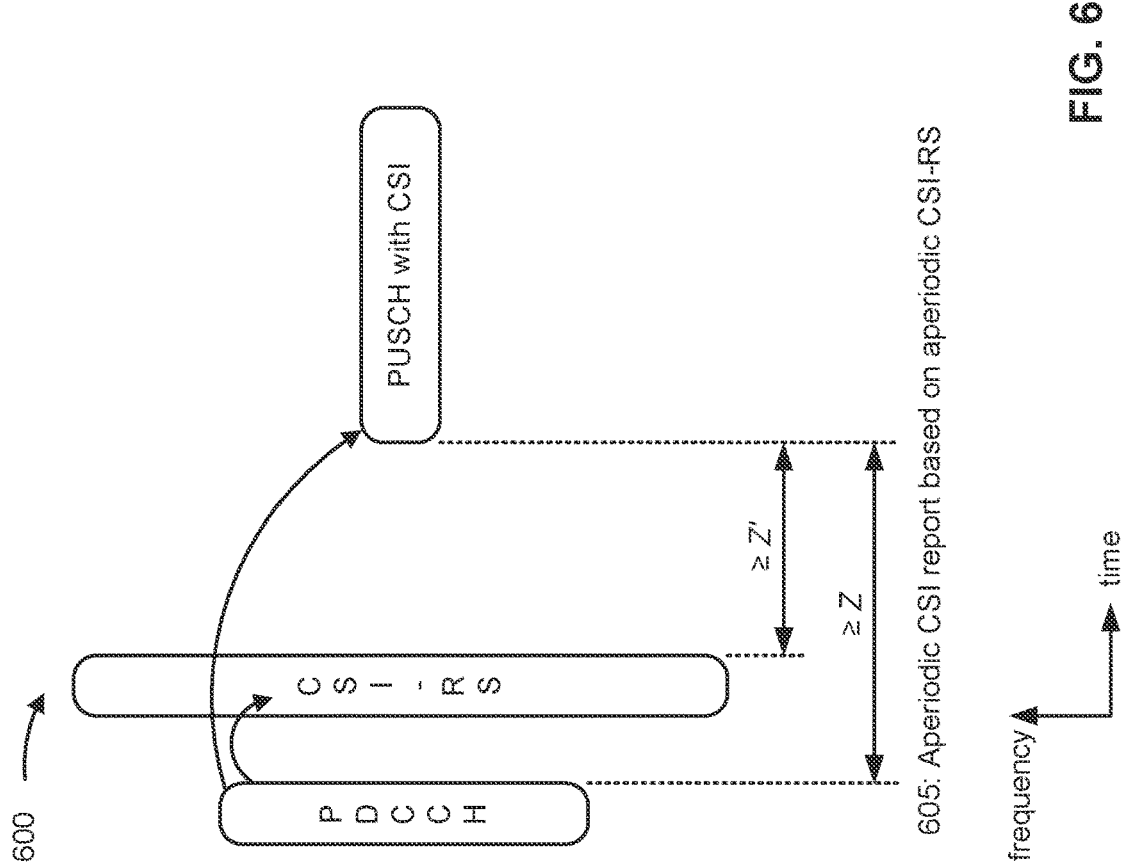

FIG. 6 is a diagram illustrating an example 600 of computing CSI processing parameters, in accordance with the present disclosure.

A UE may determine a CSI computation time associated with a CSI report. For example, in some aspects, a UE may determine a processing time (sometimes referred to as 2) between a physical downlink control channel (PDCCH) including a configuration of a CSI report (e.g., a CSI reporting setting) and a physical uplink shared channel (PUSCH) containing the CSI report. Additionally, or alternatively, the UE may determine a processing time (sometimes referred to as Z') between a CSI-RS resource associated with a CSI report and the PUSCH containing the CSI report.

More particularly, FIG. 6 illustrates Z and Z' in the context of an aperiodic CSI report based on an aperiodic CSI-RS, as shown by reference number 605, and in the context of an aperiodic CSI report based on a periodic CSI-RS, as shown by reference number 610. First, for the aperiodic CSI report based on an aperiodic CSI-RS, a period of time between the PDCCH including the configuration of the CSI report and the PUSCH containing the CSI report must be greater than or equal to Z, and the period of time between the CSI-RS resource associated with the CSI report and the PUSCH containing the CSI report must be greater than or equal to Z'. Similarly, for the aperiodic CSI report based on a periodic CSI-RS (e.g., a CSI-RS occurring with a periodicity of T), a period of time between the PDCCH including the configuration of the CSI report and the PUSCH containing the CSI report must be greater than or equal to Z, and the PUSCH can include CSI reports corresponding to CSI-RS resources that occurred greater than or equal to Z' prior to the PUSCH. Thus, in the depicted example, the PUSCH may include the CSI report corresponding to a first CSI-RS resource (e.g., the leftmost CSI-RS resource) because that resource occurred more than Z' prior to the PUSCH, but the PUSCH may not include the CSI report corresponding to a second CSI-RS resource (e.g., the rightmost CSI-RS resource) because that resource occurred less than Z' prior to the PUSCH.

The particular values of Z and Z' for a given CSI report may depend on whether the CSI report is associated with a fast CSI report time, a low-complexity CSI report time, or a high-complexity CSI report time. For example, a fast CSI report time may be associated with a configured CSI report that occurs when there are no other concurrent CSI reports; when the UE 120 will transmit only the CSI report in a given PUSCH, without other uplink data and without a hybrid automatic repeat request (HARQ) acknowledgement (ACK) feedback; when the configured CSI report is associated with a single CSI-RS resource, with up to four ports and without a CRI; when the configured CSI report is a wideband only report; and when either the configured CSI report is associated with a type I, single-panel codebook, or the configured CSI report is associated with no precoding matrix indicator (PMI) report (e.g., the parameter reportQuantity may be equal to "cri-RI-CQI," and CRI may not be reported because the configured CSI report is associated with a single CSI-RS resource). In such aspects, for subcarrier spacings of 15 kilohertz (kHz), 30 kHz, 60 kHz, and 120 kHz, Z may be 10 symbols (713.5 microseconds (μs)), 13 symbols (463.8 μs), 25 symbols (446 μs), and 43 symbols (383.5 μs), respectively, and Z' may be equal to 8 symbols (570.8 μs), 11 symbols (392.4 μs), 21 symbols (374.6 μs), and 36 symbols (321.1 μs), respectively.

A CSI report associated with a low-complexity CSI report time may include many of the attributes of a CSI report associated with a fast CSI report time, except that there may be concurrent CSI calculations and/or multiplexing with data or HARQ ACK in the PUSCH used to transmit the CSI report. That is, a low-complexity CSI report time may be associated with a configured CSI report that occurs when there may be other concurrent CSI reports; when the UE 120 may transmit more than the CSI report in a given PUSCH, such as uplink data and/or a HARQ ACK feedback in addition to the CSI report; when the configured CSI report is associated with a single CSI-RS resource, with up to four ports and without a CRI; when the configured CSI report is a wideband only report; and when either the configured CSI report is associated with a type I, single-panel codebook, or the configured CSI report is associated with no PMI report (e.g., the parameter reportQuantity may be equal to "cri-RI-CQI," and CRI may not be reported because the configured CSI report is associated with a single CSI-RS resource). In such aspects, for subcarrier spacings of 15 kHz, 30 kHz, 60 kHz, and 120 kHz, Z may be 22 symbols (1569.8 μs), 33 symbols (1177.3 μs), 44 symbols (784.9 μs), and 97 symbols (865.2 μs), respectively, and Z' may be equal to 16 symbols (1141.7 μs), 30 symbols (1070.3 μs), 42 symbols (749.2 μs), and 85 symbols (758.1 μs), respectively.

A CSI report may be associated with a high-complexity CSI report time if it does not qualify as a fast CSI report or low-complexity CSI report, using the criteria described above, and is not a CSI report associated with a beam management procedure. In such aspects, for subcarrier spacings of 15 kHz, 30 kHz, 60 kHz, and 120 kHz, Z may be 40 symbols (2854.2 μs), 72 symbols (2568.8 μs), 141 symbols (2515.2 μs), and 152 symbols (1355.7 μs), respectively, and Z' may be equal to 37 symbols (2640.1 μs), 69 symbols (2461.7 μs), 140 symbols (2497.4 μs), and 140 symbols (1248.7 μs), respectively.

While the above-described CSI processing parameters (e.g., the quantity of CSI processing units (CPUs) associated with a CSI report, a number of simultaneously active CSI-RS resources associated with a CSI report, and a CSI computation time associated with a CSI report) may correspond to a CSI processing load at the UE 120 when a single antenna port configuration is implemented (e.g., when a single codebook is utilized for a configured CSI report), the CSI processing parameters may not accurately correspond to the CSI processing load at the UE 120 when the CSI report is configured with multiple codebooks and/or antenna port configurations. More particularly, a network entity (such as a network node 110, an RU 340) may be associated with a massive-MIMO active antenna unit (AAU) that includes multiple, co-located panels consisting of multiple antenna ports. Each panel may be equipped with numerous power amplifiers and antenna subsystems, which consume large amounts of power. For example, more than 20% of all expenses associated with a wireless network may be attributed to energy costs necessary to operate the wireless network, and, of those energy costs, over 50% may be attributed to radio access network (RAN) energy costs. Thus, in an effort to reduce energy consumption or the like, a wireless network may dynamically turn off one or more panels, subpanels, or antenna ports associated with a network entity when the cell load is low.

In such aspects, a configuration of a CSI report (e.g., a CSI reporting setting), may indicate multiple codebooks, each associated with an antenna port configuration. For example, the configuration of the CSI report may indicate a first codebook associated with a base antenna port configuration including 32 antenna ports (e.g., $(N_1, N_2)=(4, 4)$, composed of four panels consisting of $(N_1, N_2)=(2, 2)$ cross-polarized antennas each), which may correspond to an antenna port configuration when no panels or subpanels are turned off. However, the configuration of the CSI report may include additional codebooks associated with reduced antenna port configurations, which may correspond to antenna port configurations when at least one panel or subpanel is turned off. For example, the configuration of the CSI report may indicate a second codebook associated with an antenna port configuration including 4 antenna ports (e.g., $(N_1, N_2)=(2, 1)$), a third and fourth codebook associated with an antenna port configuration including 8 antenna ports (e.g., $(N_1, N_2)=(2, 2)$ and $(N_1, N_2)=(4, 1)$), a fifth codebook associated with an antenna port configuration including 16 antenna ports (e.g., $(N_1, N_2)=(4, 2)$), and so forth.

In such aspects, the UE may need to derive CSI for each codebook and report the CSI for each codebook to the network entity. In some aspects, the UE may do so by providing a supplemental CSI (S-CSI) associated with each of the reduced antenna port configurations (e.g., associated with each of the second through fifth codebooks, described above). In some aspects, the S-CSI may be derived from CSI-RS resources configured for the base antenna port configuration. For example, if 32 CSI-RS resources, comprised of 4 code division multiplexed (CDM) groups, is configured for the base antenna port configuration, the UE may derive an S-CSI associated with each of the reduced antenna port configurations (e.g., associated with each of the codebooks) by using one or more CDM groups, of the four CDM groups, to derive each of the S-CSI. In some aspects, the UE may be configured or hard coded with restriction rules indicating which CSI-RS resources (e.g., which CDM groups) should be used to derive each S-CSI. In some aspects, a same CSI report configuration (e.g., CSI reporting setting) may be used to configure each of the CSI reports (e.g., the CSI report and the additional S-CSI reports), while, in some other aspects, multiple CSI report configurations may be used to configure each of the CSI reports (e.g., a first CSI report configuration may configure a report associated with the base antenna configuration, while a second CSI report may configure a report associated with the reduced antenna port configurations (e.g., codebooks two through five in the above example).

Some aspects enable accurate CSI processing parameter computations that account for multiple codebook configurations in a given CSI report configuration (e.g., in a given CSI reporting setting). In some aspects, a UE may receive a configuration of a CSI report that includes multiple codebooks, each associated with a corresponding antenna port configuration, and the UE may compute at least one CSI processing parameter based at least in part on the configuration of the CSI report (and thus the multiple codebooks included therein). For example, the UE may compute one or more of a quantity of CPUs associated with a CSI report, a CSI computation time associated with a CSI report, and a number of simultaneously active CSI-RS resources associated with a CSI report, while considering the multiple codebook configurations. This may include computing the number of CPUs based at least in part on a quantity of configured CSI-RS resources and a quantity of the multiple codebooks, computing the CSI computation time associated with the CSI report based at least in part on a pre-configured high-complexity CSI report time and a computation time scaling factor, or computing the number of simultaneously active CSI-RS resources based at least in part on a quantity of the multiple codebooks. By accounting for the multiple codebooks when computing the various CSI processing parameters described herein, a UE may more accurately account for a CSI processing load, leading to robust CSI measurements and reports, and thus improved channel quality, decreased latency, increased throughput, and overall more efficient resource utilization.

As indicated above, FIG. 6 is provided as an example. Other examples may differ from what is described with regard to FIG. 6.

Figure 7:
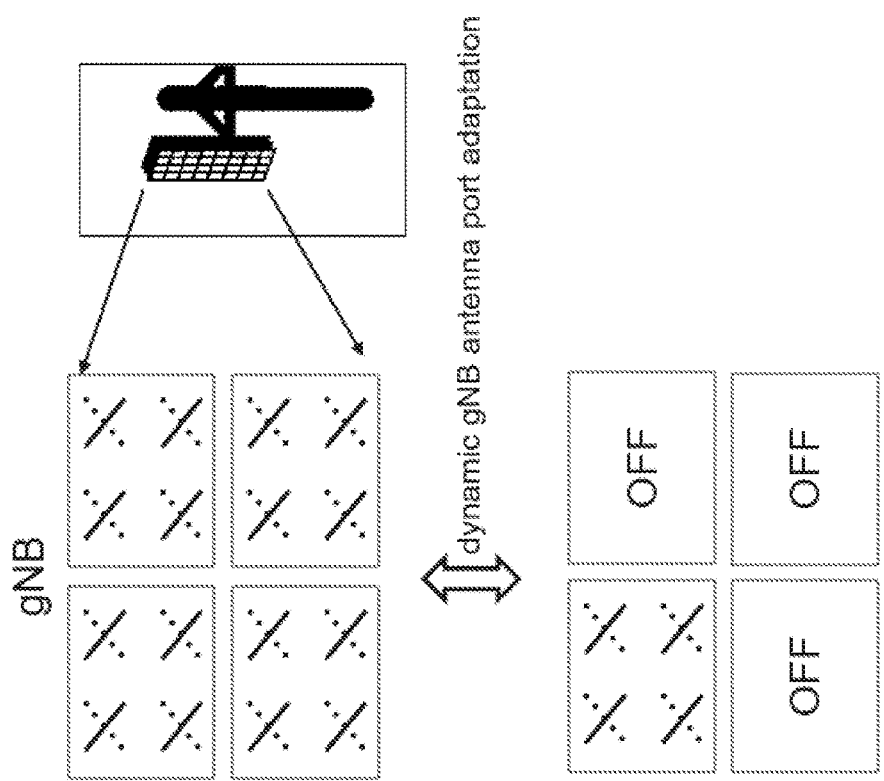
FIG. 7 is a diagram illustrating an example of spatial adaptation, in accordance with the present disclosure.

FIG. 7 is a diagram illustrating an example 700 of spatial adaptation, in accordance with the present disclosure.

Spatial adaptation at a network entity may include deactivating one or more antenna panels (spatial elements, ports) such that fewer antenna panels are active. Example 700 shows four antenna panels of a network entity (e.g., gNB). The network entity may deactivate three of the four antenna panels. The three deactivated panels are shown as OFF. Indications related to spatial element adaptation may help UEs to adapt a CSI-RS configuration to dynamic or semi-persistent ON-OFF of CSI-RS or to reconfigure the CSI-RS configuration with respect to an adapted number of spatial elements or ports.

As indicated above, FIG. 7 is provided as an example. Other examples may differ from what is described with regard to FIG. 7.

Figure 8:
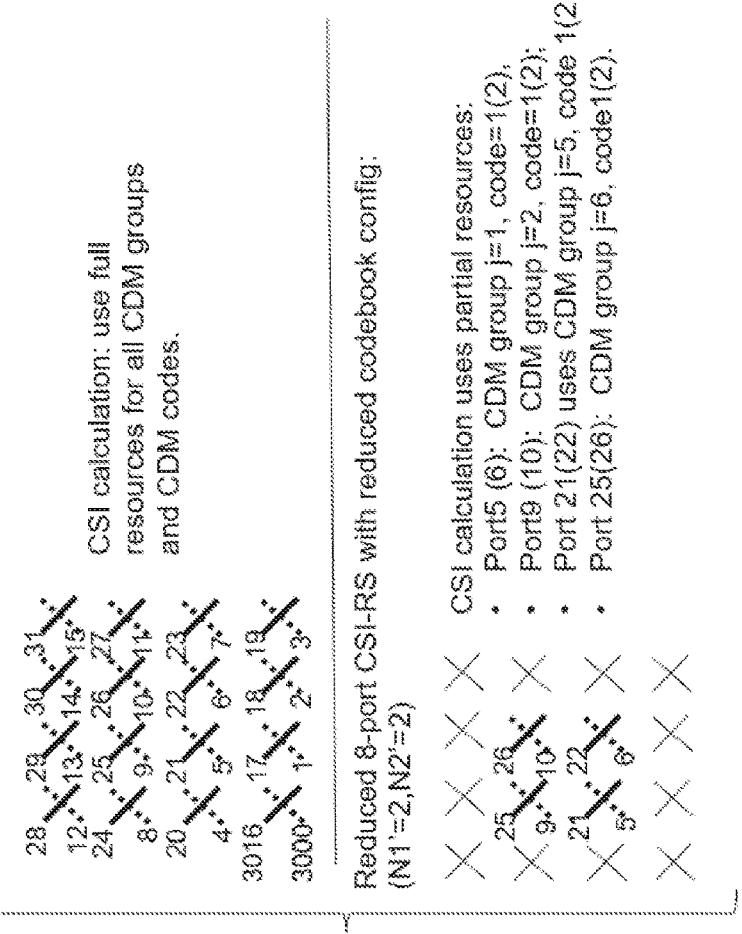
FIG. 8 is a diagram illustrating an example of an antenna subarray pattern from a CSI-RS resource, in accordance with the present disclosure.

FIG. 8 is a diagram illustrating an example 800 of an antenna subarray pattern from a CSI-RS resource, in accordance with the present disclosure.

Example 800 shows a CSI-RS resource pattern with CSI-RS ports that are mapped to port indices. The 32 ports may be divided into 8 code-division multiplexing (CDM) groups (j from 0-7). Example 800 also shows a mapping of antenna elements to CSI-RS port indices as part of a base codebook configuration. For CSI calculation, the UE may use full resources for all CDM groups and CDM codes. Each CDM group can have multiple CDM codes that can be used over the same time-frequency resource. The antenna elements may be for a two-dimensional antenna array with dimensions N1=4 and N2=4, where each side of the two-dimensional antenna array is four antenna elements long. Each antenna element has two CSI-RS ports for a total of 32 CSI-RS ports.

Example 800 further shows a reduced antenna subarray with dimensions N1'=2 and N2'=2. The total quantity of ports is 2×N1'×N2'=8 ports. A CSI calculation may use partial resources. Port 5 is part of CDM group j=1 (code=1). Port 9 is part of CDM group j=2 (code=1). Port 21 is part of CDM group j=5 (code=1). Port 25 is part of CDM group j=6 (code=1).

As indicated above, FIG. 8 is provided as an example. Other examples may differ from what is described with regard to FIG. 8.

Figure 9:
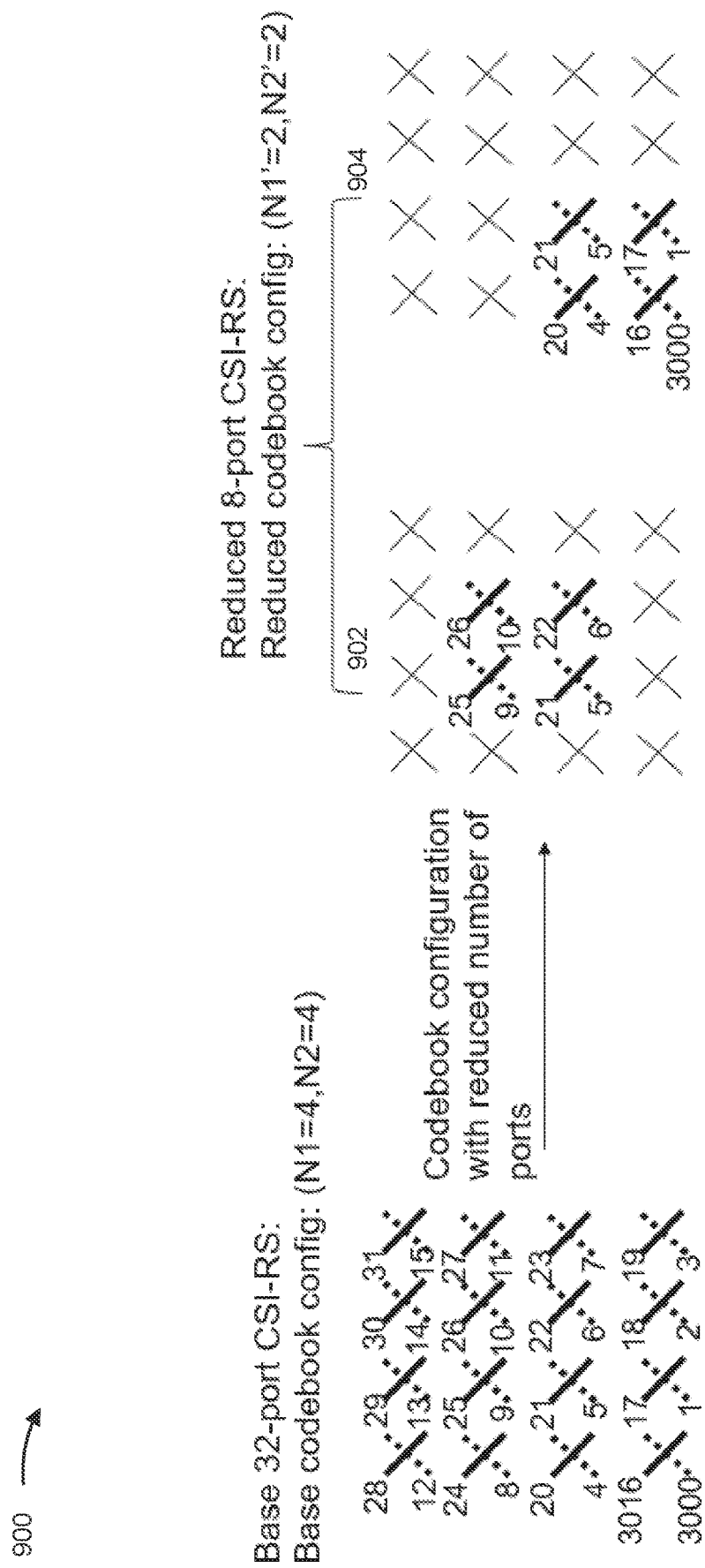
FIG. 9 is a diagram illustrating an example of antenna subarray patterns from a CSI-RS resource, in accordance with the present disclosure.

FIG. 9 is a diagram illustrating an example 900 of antenna subarray patterns from a CSI-RS resource, in accordance with the present disclosure.

A network entity (e.g., gNB) may transmit a CSI-RS signal associated with a full antenna array, and the UE may generate multiple CSIs for different antenna subarrays using the same received CSI-RS signal. Each subarray is associated with a subset of CSI-RS ports and the corresponding subset of time/frequency/code resources of the CSI-RS signal. The different subarrays are used by the UE for the purpose of CSI calculation.

Example 900 shows antenna subarray 902 and antenna subarray 904 for reduced configuration patterns from within the base codebook configuration. Antenna subarray 902 includes ports 25, 9, 26, 10, 21, 5, 22, and 6. A network entity may explicitly indicate all of the selected ports for antenna subarray 902 by port index, such as 3000+{5, 6, 9, 10, 21, 22, 25, 26}. Antenna subarray 904 includes ports 20, 4, 21, 5, 16, 3000, 17, and 1. The network entity may explicitly indicate all of the selected ports for antenna subarray 904 by port index, such as 3000+{0, 1, 4, 5, 16, 17, 20, 21}. However, the signaling overhead for each antenna subarray is 5 bits×8 ports=40 bits.

According to various aspects described herein, a UE may receive an indication of the antenna subarray with fewer signaling resources. The indication may indicate a starting port and a size of the antenna subarray, by which the UE can derive the subset of ports associated with the antenna subarray. Since there is a one-to-one mapping between a port index and the CSI-RS resource in time/frequency/code domain, with the derived set of selected ports, the UE may determine the corresponding CSI-RS resources (time/frequency/code) associated with the selected ports of the received CSI-RS signal and generate CSI for the subarray with a reduced size based at least in part on these selected resources. By indicating only the starting port (and not all of the ports), the UE may reduce the signaling overhead for the ports from 40 bits to 5 bits.

In order to save power consumption at the network entity (e.g., gNB) side, the network entity may dynamically turn on and off some of the transmit antenna elements based on channel conditions and traffic loading of different UEs. For example, for a close-by UE with very good channel conditions and/or low traffic loading (e.g., web browsing), the most energy efficient scheme for the network entity may be to turn off some of the transmit antenna elements and transmit to the UE with a low data rate. In another example, for a cell-edge UE with poor channel conditions and/or high traffic demands, the most energy efficient scheme for the network entity may be to turn on all of its transmit antenna elements and transmit to the UE with the highest achievable rate. The network entity may have various options on the quantity/locations of antenna elements (called spatial adaptation patterns) to choose from. In order to help the network entity to make the right decision, the network entity may collect channel state information (CSI) (e.g., CQI/PMI/RI) from the UE for different spatial adaptation patterns. The existing CSI framework defines signaling messages for configuring a CSI report and the CSI-RS resources used by the UE to generate the CSI report. The aspects described herein, enhance the CSI framework for spatial adaptation.

In the existing CSI framework, for each spatial adaptation pattern, the network entity is expected to configure a separate CSI-RS resource corresponding to the spatial adaptation pattern for the UE to perform channel measurements. With this approach, the quantity of CSI-RS resources required for supporting spatial adaptation scales with the quantity of patterns, and the overhead may be large. For example, if the network entity wants to obtain CSI measurements for an antenna array of (32, 16, 8, 4) antenna elements, at least 4 CSI-RS resources with (32, 16, 8, 4) ports is to be configured.

Previous solutions involve using one CSI-RS resource for channel measurements of different spatial patterns, such as using a 32-port CSI-RS resource to measure CSI associated with an antenna array of (32, 16, 8, 4) elements. To calculate CSI for a spatial pattern, the UE may only use a subset of ports from the configured CSI-RS resource. In some aspects, the network entity may enhance signaling to indicate the set of selected ports from the configured CSI-RS resource for a spatial pattern. The UE may derive a subset of ports and identify the time/frequency/code resources associated with the selected subset of ports from the received CSI-RS signal to perform channel measurements. The UE may generate a CSI report for a spatial adaptation pattern with a reduced array size. As a result, the network entity conserves power and signaling resources.

In further detail, there may be two steps for a spatial adaptation procedure. The first step involves channel estimation for different spatial patterns. A spatial pattern may refer to an antenna subarray with a (size, starting location) inside a full antenna array. The second step involves, based on CSI feedback from the UE in the first step, the network entity determining to use a specific spatial pattern for data transmission. That is, the network entity may turn on a specific subarray to save power.

The aspects described herein relate to the first step, where the network entity obtains multiple CSI(s) that are fed back from the UE, each corresponding to one spatial pattern. One solution, in some aspects, involves the network entity transmitting separate CSI-RS signals for each spatial pattern, and then the quantity of CSI-RS signals scales with the quantity of spatial patterns. An enhanced approach, in some aspects, is to transmit one CSI-RS signal and instruct the UE to feed back CSI(s) for multiple spatial patterns by processing the same received CSI-RS signal. For example, the network entity may transmit a CSI-RS signal with 32 ports and instruct the UE to feed back CSI(s) for multiple spatial patterns: full array with 32 elements (N1=4, N2=4), and subarray1 with 16 elements (N1=4, N2=2), where the starting element location corresponds to an element associated with port 3000 in the full array.

For an existing CSI framework, one CSI report configuration may include one or more resource sets, and one resource set may include one or more CSI-RS resources. Different CSI-RS resources in the same resource set may be non-overlapping, fully-overlapping or partially overlapping. The network entity may dynamically select one resource set when triggering an aperiodic CSI report via DCI. For one CSI report, the UE may perform measurements on all CSI-RS resources over the resource set selected by the network entity, select the best CSI-RS resource, calculate CSI(s), and report the selected CSI-RS resource index (CRI) and the associated CSI(s).

In some aspects, for a spatial adaptation pattern configured for a CSI report, if the CSI report is configured with multiple CSI-RS resources, one or more CSI-RS resources may be selected as the base CSI-RS resource for this spatial adaptation pattern. Example 900 in FIG. 9 shows an example of one base CSI-RS resource. In general, there can be multiple base CSI-RS resources, and each base resource can be used to derive a reduced CSI-RS resource for the spatial adaptation pattern via a set of selected ports. The network entity may indicate the selected one or more CSI-RS resources for the spatial adaptation pattern in the CSI report configuration or transmit a separate signaling message (e.g., the triggering DCI for the CSI report or the configuration message for triggering states). The UE may indicate the selected one or more CSI-RS resources in the CSI report message. In some aspects, the selected CSI-RS resource set(s) may be indicated for the spatial pattern together with selected base resource(s). If no selection is indicated, each of the CSI-RS resources configured for the CSI report may be used as the base CSI-RS resource for the spatial pattern.

As indicated above, FIG. 9 is provided as an example. Other examples may differ from what is described with regard to FIG. 9.

Figure 10:
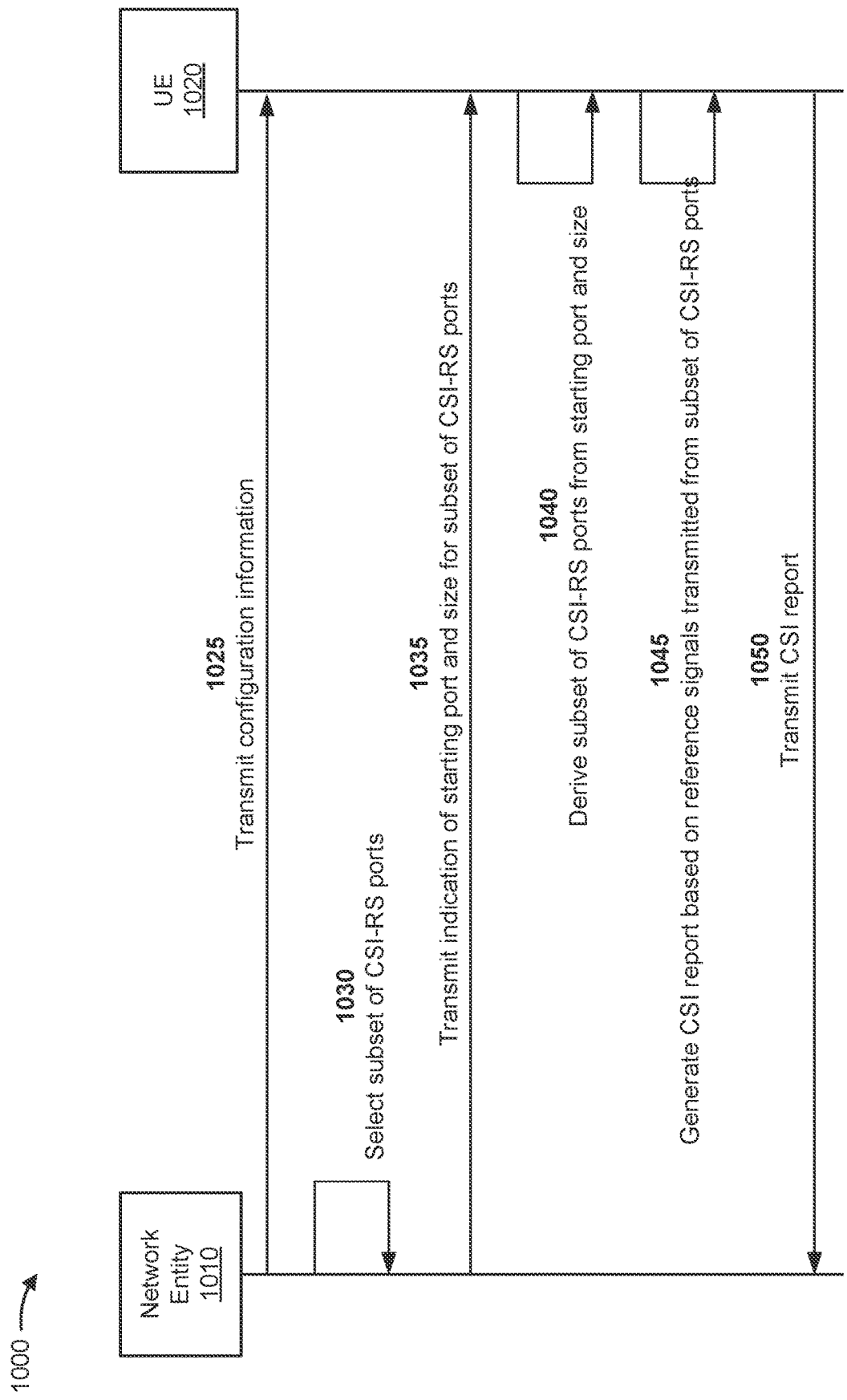
FIG. 10 is a diagram of an example associated with indicating an antenna subarray, in accordance with the present disclosure.

FIG. 10 is a diagram of an example 1000 associated with indicating an antenna subarray, in accordance with the present disclosure. As shown in FIG. 10, a network entity 1010 (e.g., network node 110) and a UE 1020 (e.g., UE 120) may communicate with each other via a wireless network (e.g., wireless network 100).

As shown by reference number 1025, the network entity 1010 may transmit configuration information. In some aspects, the UE 1020 may receive the configuration information via one or more of RRC signaling, one or more MAC CEs, and/or DCI, among other examples. In some aspects, the configuration information may include an indication of one or more configuration parameters (e.g., already known to the UE 1020 and/or previously indicated by the network entity 1010 or another network device) for selection by the UE 1020, and/or explicit configuration information for the UE 1020 to use to configure the UE 1020, among other examples.

In some aspects, the configuration information may include a configuration of a CSI report (e.g., a CSI reporting setting) including multiple codebooks. In some aspects, each codebook, of the multiple codebooks, may be associated with a corresponding antenna port configuration. For example, as described above in connection with FIG. 5, the configuration may include a configuration of a codebook associated with a base antenna port configuration (e.g., a configuration utilizing all available panels and ports), and a configuration of at least one codebook associated with a reduced antenna port configuration (e.g., a configuration utilizing less than all available panels or ports). For example, the configuration may configure a first codebook associated with a base antenna port configuration implementing all 32 antenna ports (e.g., $(N_1, N_2)=(4, 4)$, composed of four panels consisting of $(N_1, N_2)=(2, 2)$ cross-polarized antennas each), a second codebook associated with an antenna port configuration including 4 antenna ports (e.g., $(N_1, N_2)=(2, 1)$), a third and a fourth codebook, each associated with an antenna port configuration including 8 antenna ports (e.g., $(N_1, N_2)=(2, 2)$ and $(N_1, N_2)=(4, 1)$), and a fifth codebook associated with an antenna port configuration including 16 antenna ports (e.g., $(N_1, N_2)=(4, 2)$).

As shown by reference number 1030, the network entity 1010 may select a subset of CSI-RS ports. The subset of CSI-RS ports may be selected from CSI-RS ports of a CSI-RS resource associated with a two-dimensional antenna array. The quantity of ports in the subset of CSI-RS ports may be fewer than the CSI-RS ports of the CSI-RS resource. The subset of CSI-RS ports may be associated with an antenna subarray. The antenna subarray may be a reduced antenna array that is a portion of the two-dimensional antenna array.

In an example, the network entity 1010 may select a subset of CSI-RS ports from an N-port CSI-RS resource associated with a two-dimensional antenna array with size (N1, N2) and N being twice the product of N1 and N2 ($N=_2 \times N1 \times N2$). The subset of CSI-RS ports may be associated with an antenna subarray with a reduced size of (N1'≤N1, N2'≤N2), where N1'<N1 and/or N2'<N2.

As shown by reference number 1035, the network entity 1010 may transmit an indication of a starting port of the subset of CSI-RS ports. The starting port may be the smallest port number. The network entity 1010 may transmit an indication of only one CSI-RS port (the starting port and no other CSI-RS ports), in contrast to an explicit indication that identifies all of the CSI-RS ports of the antenna subarray. In some aspects, the indication may also indicate a size of the subset of CSI-RS ports. In some aspects, the indication of the starting port of and size (shown by reference number 1035) may be included in the configuration shown by reference number 1025.

In some aspects, the network entity 1010 may transmit the indication in supplemental configuration information, which is information for an additional configuration (e.g., antenna subarrays) and not for the base configuration. For example, the network entity 1010 may transmit an indication of the starting port index (e.g., smallest port index) of selected CSI-RS ports and an indication of the reduced array size (N1', N2') in supplemental configuration information. In some aspects, the supplemental configuration information may be transmitted after the configuration information in reference number 1025. In some aspects, the network entity 1010 may transmit the supplemental configuration information with the configuration information for the base configuration.

Alternatively, in some aspects, the UE 1020 may obtain the indication from stored configuration information. For example, a default value of the mapped starting port index (e.g., startPortIdxMapped=3000) may be specified in a standard.

As shown by reference number 1040, the UE 1020 may derive the subset of CSI-RS ports for the antenna array based at least in part on the starting port. The UE 1020 may derive the subset of CSI-RS ports further based at least in part on the indicated size of the antenna subarray. If the starting port is known (e.g., startPortIdxMapped=3005 or startPortIdxMapped=3000), the other CSI-RS ports for the antenna subarray follow a configured pattern of mapped ports up to the size of the antenna subarray. For example, referring to antenna subarray 902 of FIG. 9, if starting port 25 is indicated with a size of 8 ports, according to the mapping of ports to antenna elements of the base codebook configuration, the remaining CSI-RS ports of the antenna subarray are 9, 26, 10, 21, 5, 22, and 6. In some aspects, the size may be a default size, where only the starting port is necessary to derive the antenna subarray.

As shown by reference number 1045, the UE 1020 may generate a CSI report based at least in part on reference signals that are transmitted from the subset of CSI-RS ports. The network entity 1010 may activate only the subset of CSI-RS ports and the UE 1020 may measure the reference signals associated with the subset of CSI-RS ports.

Other CSI-RS ports may be deactivated. The UE 1020 may measure the reference signals and generate CSI based at least in part on the measurements and include the CSI in the CSI report. In some aspects, the UE 1020, having derived the subset of CSI-RS ports, may identify the time/frequency/code resources associated with the selected subset of CSI-RS ports from the received CSI-RS signal to perform channel measurements. In some aspects, the UE 1020 may have a single antenna element to receive a CSI-RS signal transmitted from the network entity 1010 with N transmit antenna elements. The CSI-RS signal with N-ports spans orthogonal time/frequency/code-domain resources, and thus a received signal for each transmit port may be separated by the UE 1020 with one receive antenna and the corresponding channel for each transmit port can be measured. As shown by reference number 1050, the UE 1020 may transmit the CSI report. By indicating a starting port for a subset of CSI-RS ports, the network entity 1010 may conserve signaling resources and help the UE 1020 to conserve energy and processing resources.

As indicated above, FIG. 10 is provided as an example. Other examples may differ from what is described with regard to FIG. 10.

Figure 11:
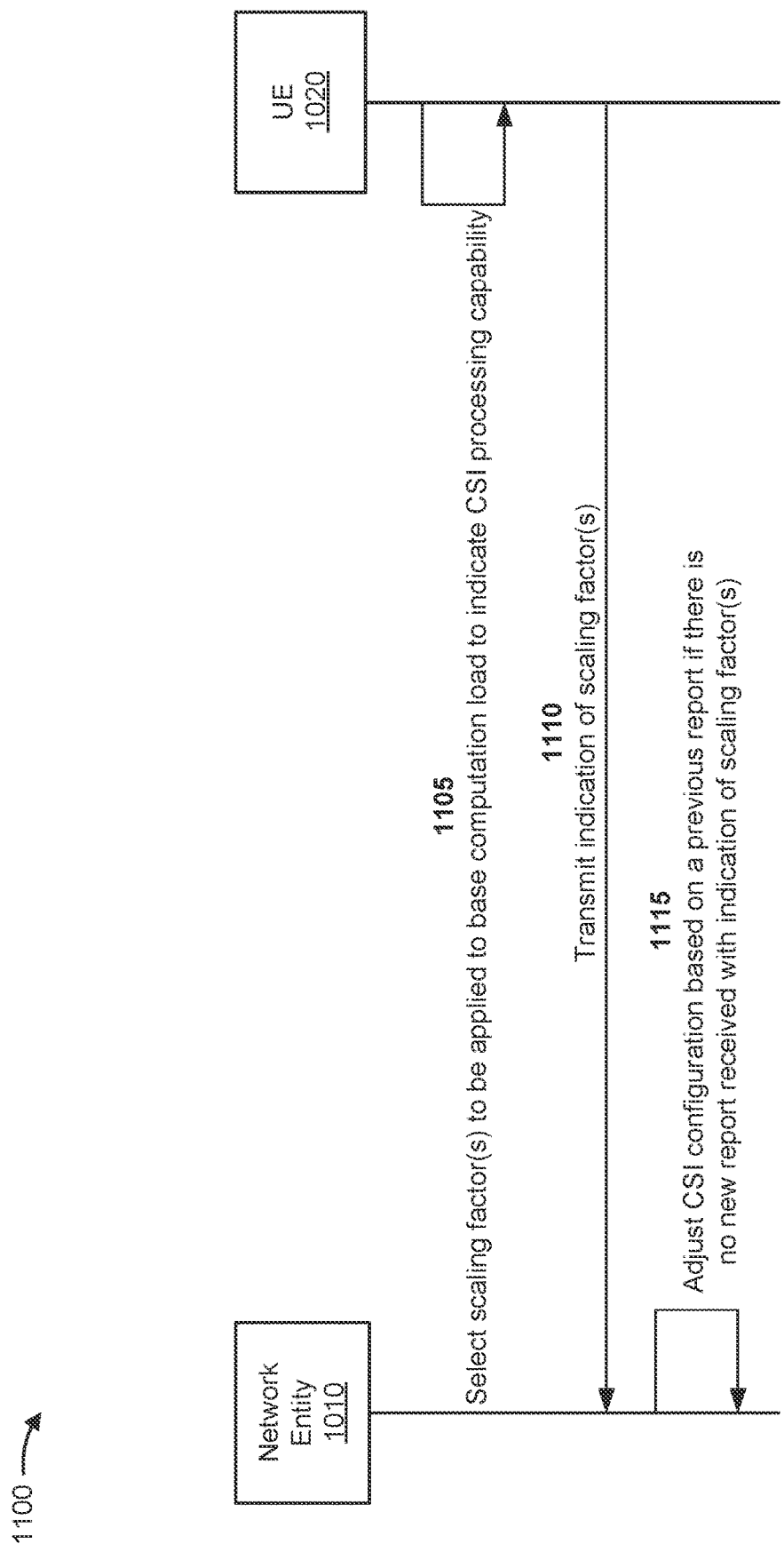
FIG. 11 is a diagram of an example associated with indicating a CSI processing capability, in accordance with the present disclosure.

FIG. 11 is a diagram of an example 1100 associated with indicating a CSI processing capability, in accordance with the present disclosure.

The UE 1020 may have a CSI processing capability. The UE 1020 may report its CSI processing capability. The capability may be associated with a quantity of simultaneous CPUs $N_{CPU}$ that the UE 1020 can use for processing CSI. The UE 1020 may keep track of the quantity of occupied CPUs with ongoing CSI reports. If the quantity of occupied CPUs exceeds $N_{CPU}$, the UE 1020 will not process more CSI and will send outdated reports.

In case of spatial or power adaptation with N different configuration values (e.g., N codebook configurations for an antenna subarray, N physical downlink shared channel (PDSCH) power offsets to CSI-RS), the computation for these N CSI values can be correlated. One type of CSI report configuration may be associated with a computation load value $O_{CPU}$ of a base configuration, which may be defined in a specification. In some aspects, the computation complexity may be scaled by a fraction of N times $O_{CPU}$. For example, the UE 1020 may determine its CSI processing capability and calculate a scaling factor that, when multiplied by the computation load $O_{CPU}$ of the base configuration, equals the CSI processing capability of the UE 1020. The scaling factor may be between 0 and 1. In some aspects, the CSI processing load may be part of a supplemental CSI configuration with an adaptation N, where the CSI processing capability may be calculated as a scaling factor×N× $O_{CPU}$.

As shown by reference number 1105, the UE 1020 may select one or more scaling factors that are to be applied to a base computation load $O_{CPU}$ to indicate a CSI processing capability of the UE 1020. As shown by reference number 1110, the UE 1020 may transmit an indication of the one or more scaling factors. The one or more scaling factors may be for a supplemental CSI report configuration that is linked to a base CSI report configuration. By using the scaling factors, the UE 1020 may use less overhead when conveying a CSI processing capability. As a result, signaling resources are conserved.

As shown by reference number 1115, the network entity 1010 may adjust a CSI configuration based at least in part on a previous report if there is no new report received with the indication of the one or more scaling factors. The network entity 1010 may identify and differentiate the outdated values from the CSI report due to a UE capability constraint $N_{CPU}$ and the one or more scaling factors. For example, if an indication of one or more scaling factors is received, the network entity 1010 may use values in a new CSI report. If an indication of one or more scaling factors is not received, the network entity 1010 may use values in an older CSI report.

In some aspects, different scaling factors may correspond to different types of adaptation schemes across multiple correlated CSI reports. For example, one scaling factor may be applied for CSI processing related to spatial adaptation, where different CSI processes are for different antenna subarrays of the network entity 1010. Another scaling factor may be applied for CSI processing related to power adaptation, where different CSI processes are for different target power offsets between CSI-RSs and PDSCH communications.

As indicated above, FIG. 11 is provided as an example. Other examples may differ from what is described with regard to FIG. 11.

Figure 12:
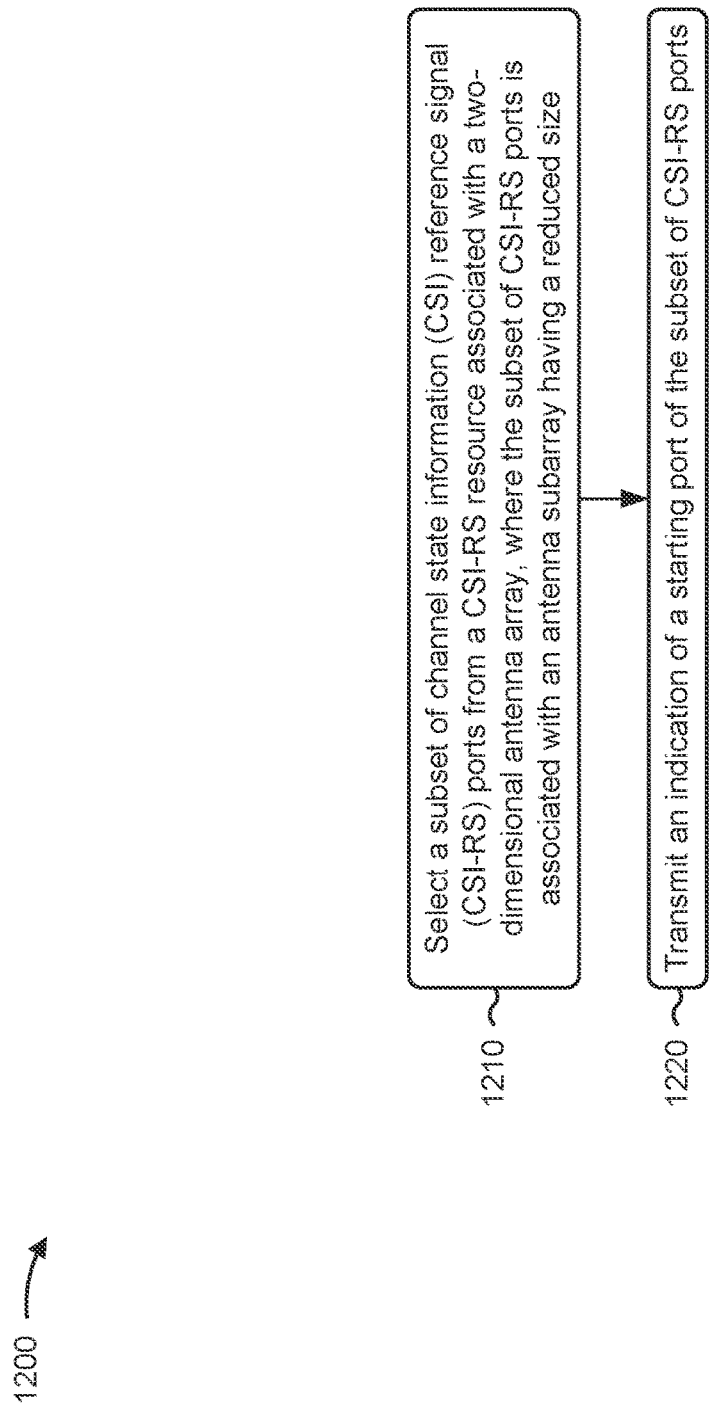
FIG. 12 is a diagram illustrating an example process performed, for example, by a network entity, in accordance with the present disclosure.

FIG. 12 is a diagram illustrating an example process 1200 performed, for example, by a network entity, in accordance with the present disclosure. Example process 1200 is an example where the network entity (e.g., network node 110, network entity 1010) performs operations associated with indicating a starting port for an antenna subarray.

As shown in FIG. 12, in some aspects, process 1200 may include selecting a subset of CSI-RS ports from a CSI-RS resource associated with a two-dimensional antenna array, where the subset of CSI-RS ports is associated with an antenna subarray having a reduced size (block 1210). For example, the network entity (e.g., using communication manager 150, depicted in FIG. 150) may select a subset of CSI-RS ports from a CSI-RS resource associated with a two-dimensional antenna array, where the subset of CSI-RS ports is associated with an antenna subarray having a reduced size, as described above.

As further shown in FIG. 12, in some aspects, process 1200 may include transmitting an indication of a starting port of the subset of CSI-RS ports (block 1220). For example, the network entity (e.g., using transmission component 1704 and/or communication manager 1706, depicted in FIG. 17) may transmit an indication of a starting port of the subset of CSI-RS ports, as described above.

Process 1200 may include additional aspects, such as any single aspect or any combination of aspects described below and/or in connection with one or more other processes described elsewhere herein.

In a first aspect, the indication indicates the reduced size.

In a second aspect, alone or in combination with the first aspect, the two-dimensional antenna array has a size (N1, N2), where a quantity N of CSI-RS ports configured for the CSI-RS resource is 2 times N1 times N2, the reduced size of the antenna subarray has dimensions (N1', N2'), and one or more of N1' is less than N1 or N2' is less than N2.

In a third aspect, alone or in combination with one or more of the first and second aspects, the subset of CSI-RS ports includes fewer ports than a quantity of CSI-RS ports configured for the CSI-RS resource.

In a fourth aspect, alone or in combination with one or more of the first through third aspects, transmitting the indication includes transmitting the indication in supplemental configuration information.

In a fifth aspect, alone or in combination with one or more of the first through fourth aspects, process 1200 includes selecting, from among multiple CSI-RS resources, the CSI-RS resource as a base CSI-RS resource for the subset of CSI-RS ports, and transmitting an indication of the CSI-RS resource.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
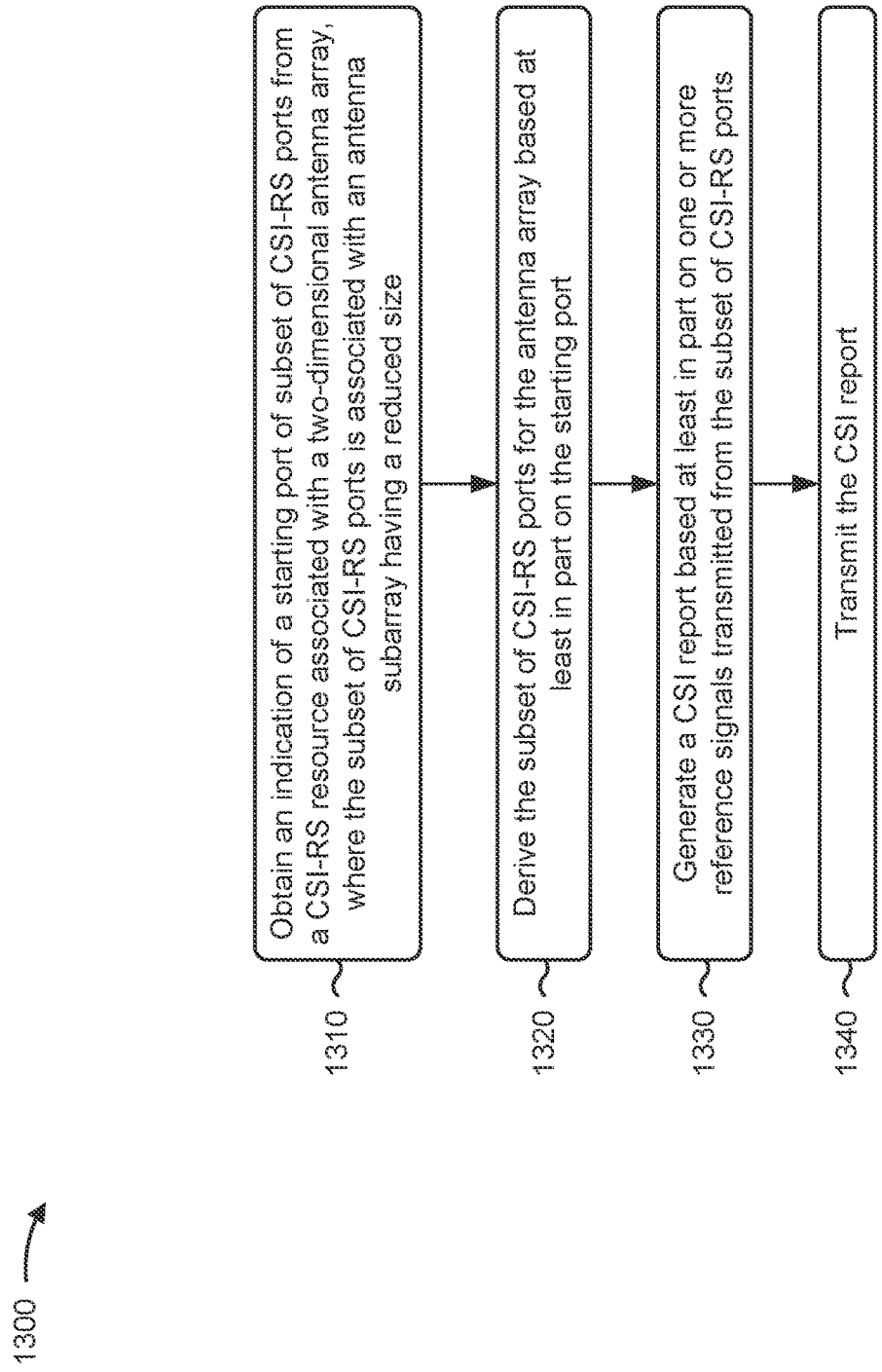
FIG. 13 is a diagram illustrating an example process performed, for example, by a UE, in accordance with the present disclosure.

FIG. 13 is a diagram illustrating an example process 1300 performed, for example, by a UE, in accordance with the present disclosure. Example process 1300 is an example where the UE (e.g., UE 120, UE 1020) performs operations associated with indicating a starting port for an antenna subarray.

As shown in FIG. 13, in some aspects, process 1300 may include obtaining an indication of a starting port of a subset of CSI-RS ports from a CSI-RS resource associated with a two-dimensional antenna array, where the subset of CSI-RS ports is associated with an antenna subarray having a reduced size (block 1310). For example, the UE (e.g., using reception component 1602 and/or communication manager 1606, depicted in FIG. 16) may obtain an indication of a starting port of a subset of CSI-RS ports from a CSI-RS resource associated with a two-dimensional antenna array, where the subset of CSI-RS ports is associated with an antenna subarray having a reduced size, as described above.

As further shown in FIG. 13, in some aspects, process 1300 may include deriving the subset of CSI-RS ports for the antenna array based at least in part on the starting port (block 1320). For example, the UE (e.g., using communication manager 1606, depicted in FIG. 16) may derive the subset of CSI-RS ports for the antenna array based at least in part on the starting port, as described above.

As further shown in FIG. 13, in some aspects, process 1300 may include generating a CSI report based at least in part on one or more reference signals transmitted from the subset of CSI-RS ports (block 1330). For example, the UE (e.g., using communication manager 1606, depicted in FIG. 16) may generate a CSI report based at least in part on one or more reference signals transmitted from the subset of CSI-RS ports, as described above.

As further shown in FIG. 13, in some aspects, process 1300 may include transmitting the CSI report (block 1340). For example, the UE (e.g., using transmission component 1604 and/or communication manager 1606, depicted in FIG. 16) may transmit the CSI report, as described above.

Process 1300 may include additional aspects, such as any single aspect or any combination of aspects described below and/or in connection with one or more other processes described elsewhere herein.

In a first aspect, the indication indicates the reduced size, and deriving the subset of CSI-RS ports includes deriving the subset of CSI-RS ports further based at least in part on the reduced size.

In a second aspect, alone or in combination with the first aspect, obtaining the indication includes receiving the indication or obtaining the indication from stored configuration information.

In a third aspect, alone or in combination with one or more of the first and second aspects, the two-dimensional antenna array has a size (N1, N2), where a quantity N of CSI-RS ports configured for the CSI-RS resource is 2 times N1 times N2, the reduced size of the antenna subarray has dimensions (N1', N2'), and one or more of N1' is less than N1 or N2' is less than N2.

In a fourth aspect, alone or in combination with one or more of the first through third aspects, the subset of CSI-RS ports includes fewer ports than a quantity of CSI-RS ports configured for the CSI-RS resource.

In a fifth aspect, alone or in combination with one or more of the first through fourth aspects, process 1300 includes transmitting an indication of one or more scaling factors that are to be applied to a base computation load to indicate a CSI processing capability of the UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
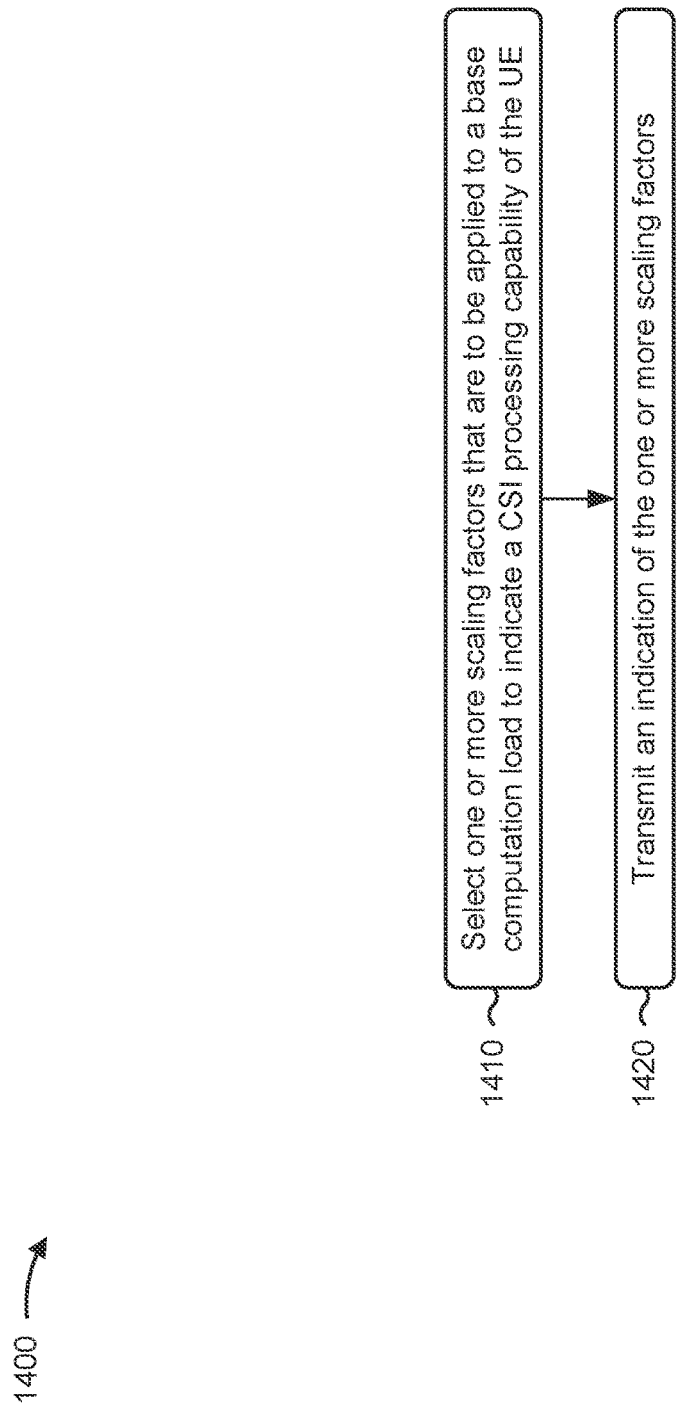
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., UE 120, 1020) performs operations associated with indicating one or more scaling factors for a CSI processing capability.

As shown in FIG. 14, in some aspects, process 1400 may include selecting one or more scaling factors that are to be applied to a base computation load to indicate a CSI processing capability of the UE (block 1410). For example, the UE (e.g., using communication manager 1606, depicted in FIG. 16) may select one or more scaling factors that are to be applied to a base computation load to indicate a CSI processing capability of the UE, as described above.

As further shown in FIG. 14, in some aspects, process 1400 may include transmitting an indication of the one or more scaling factors (block 1420). For example, the UE (e.g., using transmission component 1604 and/or communication manager 1606, depicted in FIG. 16) may transmit an indication of the one or more scaling factors, as described above.

Process 1400 may include additional aspects, such as any single aspect or any combination of aspects described below and/or in connection with one or more other processes described elsewhere herein.

In a first aspect, selecting the one or more scaling factors includes calculating a behavior processing load for the UE, and calculating the one or more scaling factors such that the behavior processing load corresponds to a product of the scaling factor and the base computation load.

In a second aspect, alone or in combination with the first aspect, calculating the behavior processing load includes calculating the behavior processing load based at least in part on a CSI processing load of a supplemental CSI configuration.

In a third aspect, alone or in combination with one or more of the first and second aspects, each scaling factor is between 0 and 1.

In a fourth aspect, alone or in combination with one or more of the first through third aspects, process 1400 includes transmitting a previous CSI report based at least in part on a CSI processing load of the UE exceeding a CSI processing capability of the UE.

In a fifth aspect, alone or in combination with one or more of the first through fourth aspects, process 1400 includes refraining from transmitting a CSI report based at least in part on a CSI processing load of the UE exceeding a CSI processing capability of the UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
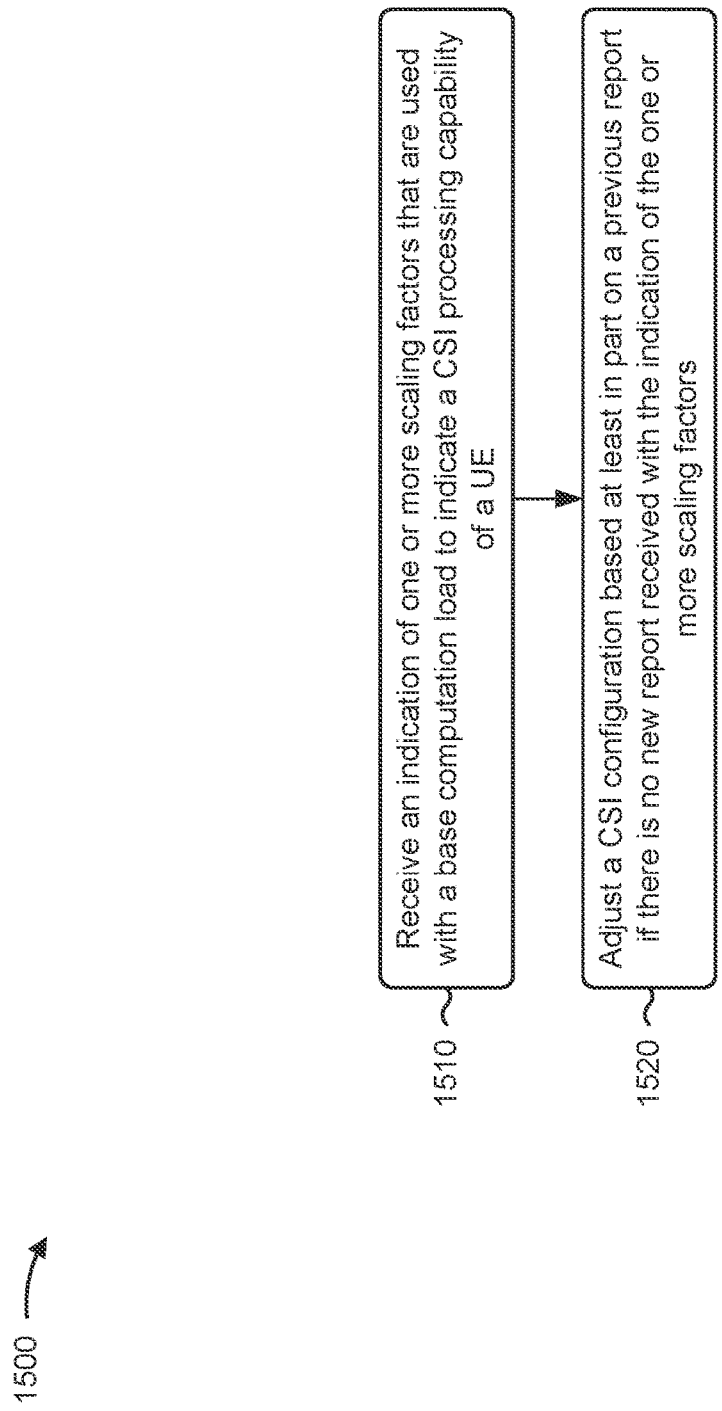
FIG. 15 is a diagram illustrating an example process performed, for example, by a network entity, in accordance with the present disclosure.

FIG. 15 is a diagram illustrating an example process 1500 performed, for example, by a network entity, in accordance with the present disclosure. Example process 1500 is an example where the network entity (e.g., network node 110, network entity 1010) performs operations associated with indicating one or more scaling factors for a CSI processing capability.

As shown in FIG. 15, in some aspects, process 1500 may include receiving an indication of one or more scaling factors that are used with a base computation load to indicate a CSI processing capability of a UE (block 1510). For example, the network entity (e.g., using reception component 1702 and/or communication manager 1706, depicted in FIG. 17) may receive an indication of one or more scaling factors that are used with a base computation load to indicate a CSI processing capability of a UE, as described above.

As further shown in FIG. 15, in some aspects, process 1500 may include adjusting a CSI configuration based at least in part on a previous report if there is no new report received with the indication of the one or more scaling factors (block 1520). For example, the network entity (e.g., using communication manager 1706, depicted in FIG. 17) may adjust a CSI configuration based at least in part on a previous report if there is no new report received with the indication of the one or more scaling factors, as described above.

Process 1500 may include additional aspects, such as any single aspect or any combination of aspects described below and/or in connection with one or more other processes described elsewhere herein.

In a first aspect, process 1500 includes calculating a CSI processing capability of the UE based at least in part on multiplying the base computation load by the one or more scaling factors.

In a second aspect, alone or in combination with the first aspect, process 1500 includes differentiating outdated values of a CSI report from new values based at least in part on the one or more scaling factors.

In a third aspect, alone or in combination with one or more of the first and second aspects, each scaling factor is between 0 and 1.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
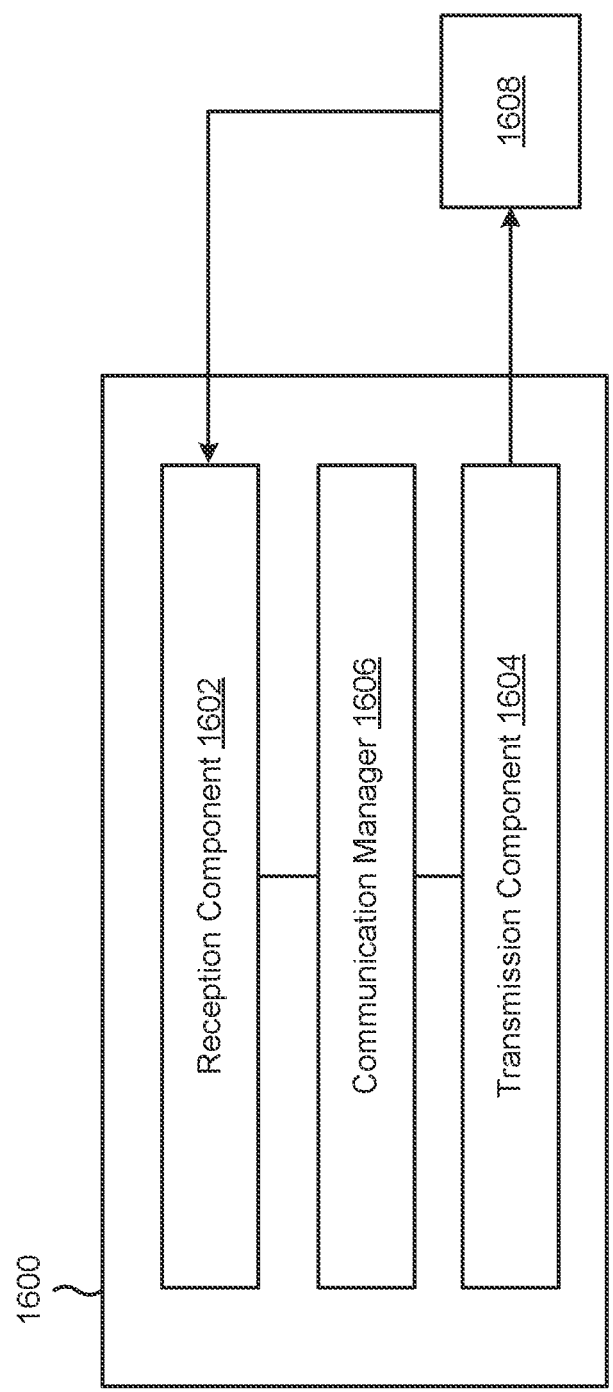
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a UE (e.g., UE 120, UE 1020), or a UE may include the apparatus 1600. In some aspects, the apparatus 1600 includes a reception component 1602, a transmission component 1604, and/or a communication manager 1606, which may be in communication with one another (for example, via one or more buses and/or one or more other components). In some aspects, the communication manager 1606 is the communication manager 140 described in connection with FIG. 1. As shown, the apparatus 1600 may communicate with another apparatus 1608, such as a UE or a network node (such as a CU, a DU, an RU, or a base station), using the reception component 1602 and the transmission component 1604.

In some aspects, the apparatus 1600 may be configured to perform one or more operations described herein in connection with FIGS. 1-11. Additionally, or alternatively, the apparatus 1600 may be configured to perform one or more processes described herein, such as process 1300 of FIG. 13, process 1400 of FIG. 14, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1608. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1608. In some aspects, one or more other components of the apparatus 1600 may generate communications and may provide the generated communications to the transmission component 1604 for transmission to the apparatus 1608. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The communication manager 1606 may support operations of the reception component 1602 and/or the transmission component 1604. For example, the communication manager 1606 may receive information associated with configuring reception of communications by the reception component 1602 and/or transmission of communications by the transmission component 1604. Additionally, or alternatively, the communication manager 1606 may generate and/or provide control information to the reception component 1602 and/or the transmission component 1604 to control reception and/or transmission of communications.

In some aspects, the reception component 1602 may obtain an indication of a starting port of a subset of CSI-RS ports from a CSI-RS resource associated with a two-dimensional antenna array, where the subset of CSI-RS ports is associated with an antenna subarray having a reduced size. The communication manager 1606 may derive the subset of CSI-RS ports for the antenna array based at least in part on the starting port. The communication manager 1606 may generate a CSI report based at least in part on one or more reference signals transmitted from the subset of CSI-RS ports. The transmission component 1604 may transmit the CSI report.

The transmission component 1604 may transmit an indication of one or more scaling factors that are to be applied to a base computation load to indicate a CSI processing capability of the UE.

In some aspects, the communication manager 1606 may select one or more scaling factors that are to be applied to a base computation load to indicate a CSI processing capability of the UE. The transmission component 1604 may transmit an indication of the one or more scaling factors.

The transmission component 1604 may transmit a previous CSI report based at least in part on a CSI processing load of the UE exceeding a CSI processing capability of the UE. The communication manager 1606 may refrain from transmitting a CSI report based at least in part on a CSI processing load of the UE exceeding a CSI processing capability of the UE.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
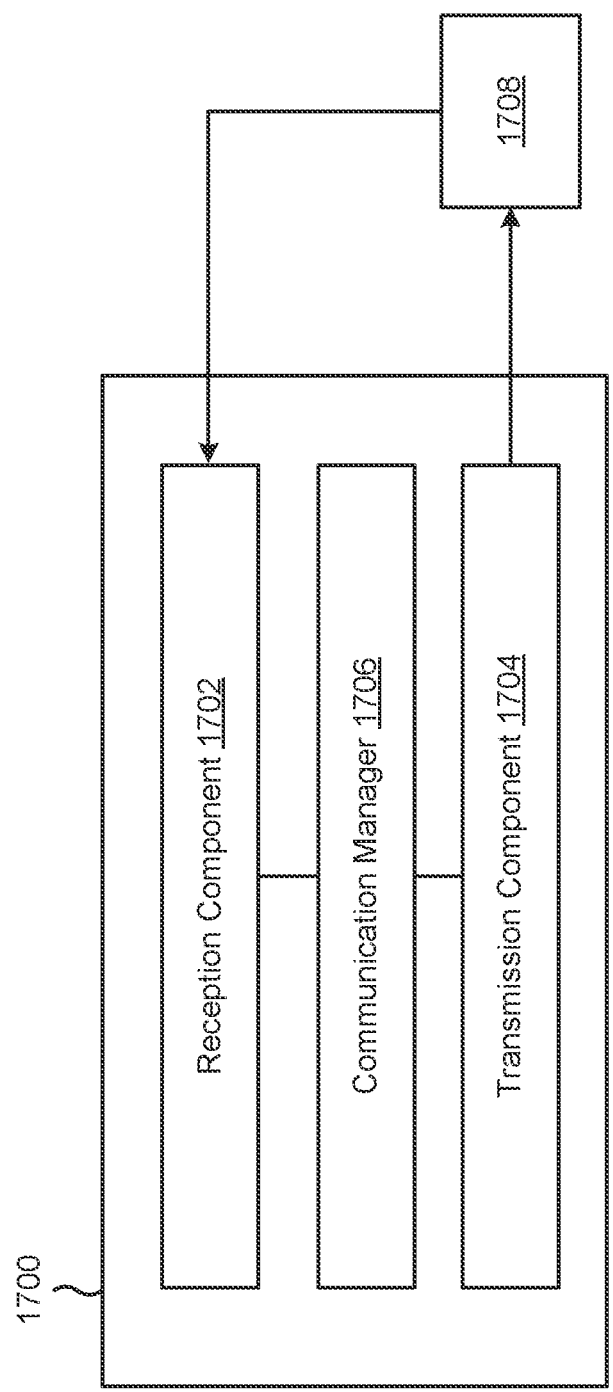
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a network entity (e.g., network node 110, network entity 1010), or a network entity may include the apparatus 1700. In some aspects, the apparatus 1700 includes a reception component 1702, a transmission component 1704, and/or a communication manager 1706, which may be in communication with one another (for example, via one or more buses and/or one or more other components). In some aspects, the communication manager 1706 is the communication manager 150 described in connection with FIG. 1. As shown, the apparatus 1700 may communicate with another apparatus 1708, such as a UE or a network node (such as a CU, a DU, an RU, or a base station), using the reception component 1702 and the transmission component 1704.

In some aspects, the apparatus 1700 may be configured to perform one or more operations described herein in connection with FIGS. 1-11. Additionally, or alternatively, the apparatus 1700 may be configured to perform one or more processes described herein, such as process 1200 of FIG. 12, process 1500 of FIG. 15, or a combination thereof. In some aspects, the apparatus 1700 and/or one or more components shown in FIG. 17 may include one or more components of the network entity described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1708. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the network entity described in connection with FIG. 2.

The transmission component 1704 may transmit communications, such as reference signals, control information, data communications, or a combination thereof, to the apparatus 1708. In some aspects, one or more other components of the apparatus 1700 may generate communications and may provide the generated communications to the transmission component 1704 for transmission to the apparatus 1708. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1708. In some aspects, the transmission component 1704 may include one or more antennas, a modem, a modulator, a transmit MIMO processor, a transmit processor, a controller/processor, a memory, or a combination thereof, of the network entity described in connection with FIG. 2. In some aspects, the transmission component 1704 may be co-located with the reception component 1702 in a transceiver.

The communication manager 1706 may support operations of the reception component 1702 and/or the transmission component 1704. For example, the communication manager 1706 may receive information associated with configuring reception of communications by the reception component 1702 and/or transmission of communications by the transmission component 1704. Additionally, or alternatively, the communication manager 1706 may generate and/or provide control information to the reception component 1702 and/or the transmission component 1704 to control reception and/or transmission of communications.

In some aspects, the communication manager 1706 may select a subset of CSI-RS ports from a CSI-RS resource associated with a two-dimensional antenna array, where the subset of CSI-RS ports is associated with an antenna subarray having a reduced size. The transmission component 1704 may transmit an indication of a starting port of the subset of CSI-RS ports.

In some aspects, the reception component 1702 may receive an indication of one or more scaling factors that are used with a base computation load to indicate a CSI processing capability of a UE. The communication manager 1706 may adjust a CSI configuration based at least in part on a previous report if there is no new report received with the indication of the one or more scaling factors.

The communication manager 1706 may calculate a CSI processing capability of the UE based at least in part on multiplying the base computation load by a scaling factor of the one or more scaling factors. The communication manager 1706 may differentiate outdated values of a CSI report from new values based at least in part on the one or more scaling factors.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a network entity, comprising: selecting a subset of channel state information (CSI) reference signal (CSI-RS) ports from a CSI-RS resource associated with a two-dimensional antenna array, wherein the subset of CSI-RS ports is associated with an antenna subarray having a reduced size; and transmitting an indication of a starting port of the subset of CSI-RS ports.

Aspect 2: The method of Aspect 1, wherein the indication indicates the reduced size.

Aspect 3: The method of any of Aspects 1-2, wherein the two-dimensional antenna array has a size (N1, N2), wherein a quantity N of CSI-RS ports configured for the CSI-RS resource is 2 times N1 times N2, wherein the reduced size of the antenna subarray has dimensions (N1', N2'), and wherein one or more of N1' is less than N1 or N2' is less than N2.

Aspect 4: The method of any of Aspects 1-3, wherein the subset of CSI-RS ports includes fewer ports than a quantity of CSI-RS ports configured for the CSI-RS resource.

Aspect 5: The method of any of Aspects 1-4, wherein transmitting the indication includes transmitting the indication in supplemental configuration information.

Aspect 6: The method of any of Aspects 1-5, further comprising: selecting, from among multiple CSI-RS resources, the CSI-RS resource as a base CSI-RS resource for the subset of CSI-RS ports; and transmitting an indication of the CSI-RS resource.

Aspect 7: A method of wireless communication performed by a user equipment (UE), comprising: obtaining an indication of a starting port of a subset of channel state information (CSI) reference signal (CSI-RS) ports from a CSI-RS resource associated with a two-dimensional antenna array, wherein the subset of CSI-RS ports is associated with an antenna subarray having a reduced size; deriving the subset of CSI-RS ports for the antenna array based at least in part on the starting port; generating a CSI report based at least in part on one or more reference signals transmitted from the subset of CSI-RS ports; and transmitting the CSI report.

Aspect 8: The method of Aspect 7, wherein the indication indicates the reduced size, and wherein deriving the subset of CSI-RS ports includes deriving the subset of CSI-RS ports further based at least in part on the reduced size.

Aspect 9: The method of any of Aspects 7-8, wherein obtaining the indication includes receiving the indication or obtaining the indication from stored configuration information.

Aspect 10: The method of any of Aspects 7-9, wherein the two-dimensional antenna array has a size (N1, N2), wherein a quantity N of CSI-RS ports configured for the CSI-RS resource is 2 times N1 times N2, wherein the reduced size of the antenna subarray has dimensions (N1', N2'), and wherein one or more of N1' is less than $N_1$ or N2' is less than N2.

Aspect 11: The method of any of Aspects 7-10, wherein the subset of CSI-RS ports includes fewer ports than a quantity of CSI-RS ports configured for the CSI-RS resource.

Aspect 12: The method of any of Aspects 7-11, further comprising transmitting an indication of one or more scaling factors that are to be applied to a base computation load to indicate a CSI processing capability of the UE.

Aspect 13: A method of wireless communication performed by a user equipment (UE), comprising: selecting one or more scaling factors that are to be applied to a base computation load to indicate a channel state information (CSI) processing capability of the UE; and transmitting an indication of the one or more scaling factors.

Aspect 14: The method of Aspect 13, wherein selecting the one or more scaling factors includes: calculating a behavior processing load for the UE; and calculating a scaling factor of the one or more scaling factors such that the behavior processing load corresponds to a product of the scaling factor and the base computation load.

Aspect 15: The method of Aspect 14, wherein calculating the behavior processing load includes calculating the behavior processing load based at least in part on a CSI processing load of a supplemental CSI configuration.

Aspect 16: The method of any of Aspects 13-15, wherein each scaling factor is between 0 and 1.

Aspect 17: The method of any of Aspects 13-16, further comprising transmitting a previous CSI report based at least in part on a CSI processing load of the UE exceeding a CSI processing capability of the UE.

Aspect 18: The method of any of Aspects 13-17, further comprising refraining from transmitting a CSI report based at least in part on a CSI processing load of the UE exceeding a CSI processing capability of the UE.

Aspect 19: A method of wireless communication performed by a network entity, comprising: receiving an indication of one or more scaling factors that are used with a base computation load to indicate a channel state information (CSI) processing capability of a user equipment (UE); and adjusting a CSI configuration based at least in part on a previous report if there is no new report received with the indication of the one or more scaling factors.

Aspect 20: The method of Aspect 19, further comprising calculating a CSI processing capability of the UE based at least in part on multiplying the base computation load by a scaling factor of the one or more scaling factors.

Aspect 21: The method of any of Aspects 19-20, further comprising differentiating outdated values of a CSI report from new values based at least in part on the one or more scaling factors.

Aspect 22: The method of any of Aspects 19-21, wherein each scaling factor is between 0 and 1.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for wireless communication, comprising:
   a memory; and
   one or more processors, coupled to the memory, configured to:
   select a subset of channel state information (CSI) reference signal (CSI-RS) ports from a CSI-RS resource associated with a two-dimensional antenna array, wherein the subset of CSI-RS ports is associated with an antenna subarray having a reduced size relative to the two-dimensional antenna array; and
   transmit an indication of a starting port of the subset of CSI-RS ports in supplemental configuration information.

2. The network entity of claim 1, wherein the indication indicates the reduced size.

3. The network entity of claim 1, wherein the two-dimensional antenna array has a size (N1, N2), wherein a quantity N of CSI-RS ports configured for the CSI-RS resource is 2 times N1 times N2, wherein the reduced size of the antenna subarray has dimensions (N1', N2'), and wherein one or more of N1' is less than N1 or N2' is less than N2.

4. The network entity of claim 1, wherein the subset of CSI-RS ports includes fewer ports than a quantity of CSI-RS ports configured for the CSI-RS resource.

5. The network entity of claim 1, wherein the one or more processors, to transmit the indication, are configured to transmit the indication in supplemental configuration information.

6. The network entity of claim 1, wherein the one or more processors are configured to:
   select, from among multiple CSI-RS resources, the CSI-RS resource as a base CSI-RS resource for the subset of CSI-RS ports; and
   transmit an indication of the CSI-RS resource.

7. A user equipment (UE) for wireless communication, comprising:
   a memory; and
   one or more processors, coupled to the memory, configured to:
   obtain an indication of a starting port of a subset of channel state information (CSI) reference signal (CSI-RS) ports from a CSI-RS resource associated with a two-dimensional antenna array, wherein the subset of CSI-RS ports is associated with an antenna subarray having a reduced size relative to the two-dimensional antenna array;
   derive the subset of CSI-RS ports for the two-dimensional antenna array based at least in part on the starting port;
   generate a CSI report based at least in part on one or more reference signals transmitted from the subset of CSI-RS ports; and
   transmit the CSI report.

8. The UE of claim 7, wherein the indication indicates the reduced size, and wherein the one or more processors, to derive the subset of CSI-RS ports, are configured to derive the subset of CSI-RS ports further based at least in part on the reduced size.

9. The UE of claim 7, wherein the two-dimensional antenna array has a size (N1, N2), wherein a quantity N of CSI-RS ports configured for the CSI-RS resource is 2 times N1 times N2, wherein the reduced size of the antenna subarray has dimensions (N1', N2'), and wherein one or more of N1' is less than N1 or N2' is less than N2.

10. The UE of claim 7, wherein the subset of CSI-RS ports includes fewer ports than a quantity of CSI-RS ports configured for the CSI-RS resource.

11. The UE of claim 7, wherein the one or more processors are configured to transmit an indication of one or more scaling factors that are to be applied to a base computation load to indicate a CSI processing capability of the UE.

12. A method of wireless communication performed by a network entity, comprising:

selecting a subset of channel state information (CSI) reference signal (CSI-RS) ports from a CSI-RS resource associated with a two-dimensional antenna array, wherein the subset of CSI-RS ports is associated with an antenna subarray having a reduced size relative to the two-dimensional antenna array; and transmitting an indication of a starting port of the subset of CSI-RS ports.

13. The method of claim 12, wherein the indication indicates the reduced size.

14. The method of claim 12, wherein the two-dimensional antenna array has a size (N1, N2), wherein a quantity N of CSI-RS ports configured for the CSI-RS resource is 2 times N1 times N2, wherein the reduced size of the antenna subarray has dimensions (N1', N2'), and wherein one or more of N1' is less than N1 or N2' is less than N2.

15. The method of claim 12, wherein the subset of CSI-RS ports includes fewer ports than a quantity of CSI-RS ports configured for the CSI-RS resource.

16. The method of claim 12, wherein transmitting the indication comprises transmitting the indication in supplemental configuration information.

17. The method of claim 12, further comprising:

selecting, from among multiple CSI-RS resources, the CSI-RS resource as a base CSI-RS resource for the subset of CSI-RS ports; and transmitting an indication of the CSI-RS resource.

18. A method of wireless communication performed by a user equipment (UE), comprising:

obtaining an indication of a starting port of a subset of channel state information (CSI) reference signal (CSI-RS) ports from a CSI-RS resource associated with a two-dimensional antenna array, wherein the subset of CSI-RS ports is associated with an antenna subarray having a reduced size relative to the two-dimensional antenna array;

deriving the subset of CSI-RS ports for the two-dimensional antenna array based at least in part on the starting port;

generating a CSI report based at least in part on one or more reference signals transmitted from the subset of CSI-RS ports; and transmitting the CSI report.

19. The method of claim 18, wherein the indication indicates the reduced size, and wherein deriving the subset of CSI-RS ports comprises deriving the subset of CSI-RS ports further based at least in part on the reduced size.

20. The method of claim 18, wherein obtaining the indication comprises receiving the indication or obtaining the indication from stored configuration information.

* * * * *